United States Patent
Kasahara

[11] Patent Number: 6,074,111
[45] Date of Patent: Jun. 13, 2000

[54] PRINTING SYSTEM, PHOTOGRAPHING APPARATUS, PRINTING APPARATUS AND COMBINING METHOD

[75] Inventor: Takeshi Kasahara, Tokyo, Japan

[73] Assignee: Casio Computer Co., Ltd., Tokyo, Japan

[21] Appl. No.: 09/125,643

[22] PCT Filed: Dec. 19, 1997

[86] PCT No.: PCT/JP97/04711

§ 371 Date: Aug. 18, 1998

§ 102(e) Date: Aug. 18, 1998

[87] PCT Pub. No.: WO98/30021

PCT Pub. Date: Jul. 9, 1998

[30] Foreign Application Priority Data

Dec. 25, 1996 [JP] Japan .................................... 8-346332

[51] Int. Cl.[7] .................................................. B41J 11/44
[52] U.S. Cl. ................................ 400/76; 400/61; 400/70
[58] Field of Search ................................ 400/76, 70, 61; 348/222, 207

[56] References Cited

U.S. PATENT DOCUMENTS

| | | | |
|---|---|---|---|
| D. 356,098 | 3/1995 | Tamura ................................... | D16/202 |
| 4,074,324 | 2/1978 | Barrett .................................... | 358/296 |
| 5,459,819 | 10/1995 | Watkins et al. ......................... | 395/117 |
| 5,477,264 | 12/1995 | Sarbadhikara et al. ................. | 348/231 |
| 5,633,678 | 5/1997 | Parulski et al. ......................... | 348/232 |
| 5,706,097 | 1/1998 | Schelling et al. ....................... | 358/296 |
| 5,737,491 | 4/1998 | Allen et al. ............................. | 395/2.79 |
| 5,815,645 | 9/1998 | Fredlund et al. ....................... | 395/117 |

FOREIGN PATENT DOCUMENTS

| | | |
|---|---|---|
| 0 418 439 A1 | 3/1991 | European Pat. Off. . |
| 0418439A1 | 3/1991 | European Pat. Off. . |
| 0 647 057 A1 | 4/1995 | European Pat. Off. . |
| 0 675 648 A2 | 10/1995 | European Pat. Off. . |
| 0675648A2 | 10/1995 | European Pat. Off. . |
| WO 95/16323 | 6/1995 | WIPO . |

*Primary Examiner*—John S. Hilten
*Assistant Examiner*—Charles H. Nolan, Jr.
*Attorney, Agent, or Firm*—Frishauf, Holtz, Goodman, Langer & Chick, P.C.

[57] ABSTRACT

A digital still camera combines a display pattern received from a printing apparatus and a photographed image with each other, and displays the resultant image on a viewfinder. A user adjusts the balance between the display pattern and the image of the object both being displayed on the viewfinder, and depresses a shutter release button. The digital still camera fetches the photographed image. The digital still camera sends to the printing apparatus the fetched image and a pattern name specifying the display pattern used at the time of photographing. The printing apparatus combines the decoration pattern specified by the pattern and the image received from the digital still camera into composite image data. The printing apparatus prints the composite image data.

18 Claims, 17 Drawing Sheets

DIGITAL CAMERA

PRINTING SYSTEM, PHOTOGRAPHING APPARATUS, PRINTING APPARATUS AND COMBINING METHOD

TECHNICAL FIELD

The present invention relates to a printing system, a printing apparatus, a photographing apparatus and a combining method for combining an image to be printed and a decoration pattern including a figure and/or a design into a composite image.

BACKGROUND ART

Electronic apparatuses such as recent personal computers can deal with media like video data, audio data and character data. Conventionally the personal computers process mainly character data by executing software such as a database, a word processor, a spreadsheet, etc. Nowadays the personal computers comprise an internal memory having a large capacity, an MPEG (Motion Picture Expert Group) circuit, an integrated high-speed modem, etc., and can process image data by executing software for reproducing still images and moving images, communication software and so forth.

Due to the standardization of an interface and a communication routine, electronic apparatuses of today can send and receive data to and from other different electronic apparatuses. A digital still camera can send and receive image data stored at the time of photographing to and from a personal computer.

When sending the image data stored in a digital still camera to a personal computer, a user makes the personal computer execute data communication software under the condition wherein the digital still camera and the personal computer are connected to each other via a communication cable. The personal computer communicates with the digital still camera and receives the image data therefrom through the communication cable. Using the personal computer, the user can freely process the image data received from the digital still camera. The user makes the personal computer execute image processing software so that he/she can process and print the image data received from the digital still camera.

Of late, a printing apparatus which is connected directly to a digital still camera via a communication cable and which prints the image data received from the digital still camera has been proposed. One of the characteristics of this printing apparatus is the decoration printing function of applying a decoration to the image data received from the digital still camera and printing the resultant image data.

Using the decoration printing function, the printing apparatus combines a decoration pattern including a figure and/or a design with the image data received from the digital still camera, and prints the resultant composite image.

However, this printing apparatus, which simply superimposes a decoration pattern on the image data received from the digital still camera, cannot always print a composite image satisfactory to the user. For example, in the case where the image of a person in the photographed image data is located in an upper position within the frame, the decoration pattern overlaps the head of the person in the printed composite image, and thus the image data and the decoration pattern are unbalanced. In order to attain a composite image in which the image data and the decoration pattern are well balanced, the user has to photograph the object over and over again or has to take photographs so that the object in the photographs are located in different positions.

DISCLOSURE OF INVENTION

It is therefore an object of the present invention to provide a printing system, a printing apparatus, a photographing apparatus and a combining method, by which image data and a decoration pattern can be combined into a composite image with a balance attained therebetween.

According to the first aspect of the present invention having the above described object, there is provided a printing system comprising a photographing apparatus and a printing apparatus, the photographing apparatus including photographing means (20, 21, 22, 23, 24a, 24b) for photographing an image of an object to be photographed, image display means (35) for displaying the image photographed by the image photographing means (20, 21, 22, 23, 24a, 24b), image fetching means (30, ST13) for fetching the image photographed by the photographing means (20, 21, 22, 23, 24a, 24b), image storing means (27) for storing the image fetched by the image fetching means (30, ST13), and photographed image supplying means (38) for supplying the image stored in the image storing means (27) to the printing apparatus, the printing apparatus including decoration pattern storing means (46) connectable to the photographing apparatus via a communication medium and provided for storing decoration patterns, image receiving means (45) for receiving the image supplied from the photographed image supplying means (38), image combining means (40, W9) for combining the image received by the image receiving means (45) and one of the decoration patterns stored in the decoration pattern storing means (46) with each other, thereby creating a composite image, and printing means (47) for printing the composite image created by the image combining means (40, W9), characterized in that:

the photographing apparatus further includes pattern receiving means (38) for receiving, from the printing apparatus through the communication medium, a display pattern having the same shape as the decoration pattern combined with the image received by the image receiving means (45), pattern storing means (27, 29) for storing the display pattern received by the pattern receiving means (38), image display control means (30, ST10) for supplying the display pattern stored in the pattern storing means (27, 29) to the image display means (35), together with the image photographed by the photographing means (20, 21, 22, 23, 24a, 24b), pattern information generating means (30) for generating pattern information specifying the display pattern which the image display control means (30, ST10) supplies to the image display means (35), and pattern information supplying means (38) for supplying, to the printing apparatus through the communication medium, the pattern information generated by the pattern information generating means (30), the printing apparatus further includes pattern supplying means (45) for supplying the display pattern to the pattern receiving means (38), pattern information receiving means (45) for receiving the pattern information supplied from the pattern information supplying means (38), decoration pattern readout means (40) for reading out, from the decoration pattern storing means (46), one of the decoration patterns which is specified by the pattern information received by the pattern information receiving means (45), and image combining control means (40, W9) for supplying the image received by the image receiving means (45) and the decoration pattern read out by the decoration pattern readout means (40) to the image combining means (40, W9) and for controlling the image combining means (40, W9) to create the composite image.

According to this printing system, the pattern receiving means (38) of the photographing apparatus receives a display pattern from the printing apparatus. The image display means (35) of the photographing apparatus displays the display pattern received by the pattern receiving means (38), together with the image photographed by the photographing means (20, 21, 22, 23, 24a, 24b). After balancing the image with the display pattern, a user takes a photograph of the object. The image receiving means (45) of the printing apparatus receives the photographed image from the photographing apparatus. The pattern information receiving means (45) of the printing apparatus receives pattern information specifying the display pattern from the photographing apparatus. The printing apparatus reads out, from the decoration pattern storing means (46), that one of the decoration patterns which is specified by the pattern information received by the pattern information receiving means (45). The image combining means (40, W9) of the printing apparatus combines the image received by the image receiving means (45) and the read-out decoration pattern with each other, thereby creating a composite image. The printing means (47) of the printing apparatus prints the composite image created by the image combining means (40, W9). Consequently, the user can attain the composite image in which the photographed image and the decoration pattern are well balanced.

According to the second aspect of the present invention having the above-described object, there is provided a printing system comprising a photographing apparatus and a printing apparatus, the photographing apparatus including photographing means (20, 21, 22, 23, 24a, 24b) for photographing an image of an object to be photographed, image display means (35) for displaying the image photographed by the image photographing means (20, 21, 22, 23, 24a, 24b), image fetching means (30, ST13) for fetching the image photographed by the photographing means (20, 21, 22, 23, 24a, 24b), image storing means (27) for storing the image fetched by the image fetching means (30, ST13), and photographed image supplying means (38) for supplying the image stored in the image storing means (27) to the printing apparatus, the printing apparatus including decoration pattern storing means (46) connectable to the photographing apparatus via a communication medium and provided for storing decoration patterns, image receiving means (45) for receiving the image supplied from the photographed image supplying means (38), image combining means (40, W9) for combining the image received by the image receiving means (45) and one of the decoration patterns stored in the decoration pattern storing means (46) with each other, thereby creating a composite image, and printing means (47) for printing the composite image created by the image combining means (40, W9), characterized in that:

the photographing apparatus further includes photographed image processing means (30) for processing the image stored in the image storing means (27) and supplying the processed image to the image display means (35), pattern receiving means (38) for receiving, from the printing apparatus through the communication medium, a display pattern having the same shape as the decoration pattern combined with the image received by the image receiving means (45), image display control means (30) for supplying the display pattern received by the pattern receiving means (38) to the image display means (35), together with the image supplied from the photographed image processing means (30), and image supply control means (30) for supplying the image processed by the image processing means (30) to the photographed image supplying means (38) and for controlling the photographed image supplying means (38) to supply the image to the printing apparatus through the communication medium, in accordance with an image request signal supplied from the printing apparatus through the communication medium; and the printing apparatus further includes pattern supplying means (45) for supplying the display pattern to the pattern receiving means (38), image request means (40) for supplying the image request signal to the image supply control means (30) through the communication medium, decoration pattern readout means (40) for reading out, from the decoration pattern storing means (46), one of the decoration patterns which corresponds to the display pattern supplied from the pattern supplying means (45) to the pattern receiving means (38), and image combining control means (40, W9) for supplying the image received by the image receiving means (45) and the decoration pattern read out by the decoration pattern readout means (40) to the image combining means (40, W9) and for controlling the image combining means (40, W9) to create the composite image.

According to this printing system, the pattern receiving means (38) of the photographing apparatus receives a display pattern from the printing apparatus. The image display means (35) of the photographing apparatus displays the display pattern received by the pattern receiving means (38), together with the image stored in the image storing means (27). After balancing the image with the display pattern, the user processes the image stored in the image storing means (27), using the photographed image processing means (30). The image receiving means (45) of the printing apparatus receives the processed image from the photographing apparatus. The pattern information receiving means (45) of the printing apparatus receives pattern information specifying the display pattern from the photographing apparatus. The printing apparatus reads out, from the decoration pattern storing means (46), that one of the decoration patterns which is specified by the pattern information received by the pattern information receiving means (45). The image combining means (40, W9) of the printing apparatus combines the image received by the image receiving means (45) and the read-out decoration pattern with each other, thereby creating a composite image. The printing means (47) of the printing apparatus prints the composite image created by the image combining means (40, W9). Consequently, the user can attain the composite image in which the photographed image and the decoration pattern are well balanced.

According to the third aspect of the present invention having the above-described object, there is provided a photographing apparatus comprising photographing means (20, 21, 22, 23, 24a, 24b) connectable to a printing apparatus via a communication medium and provided for photographing an image of an object to be photographed, image display means (35) for displaying the image photographed by the image photographing means (20, 21, 22, 23, 24a, 24b), image fetching means (30, ST13) for fetching the image photographed by the photographing means (20, 21, 22, 23, 24a, 24b), image storing means (27) for storing the image fetched by the image fetching means (30, ST13), and photographed image supplying means (38) for supplying the image stored in the image storing means (27) to the printing apparatus, characterized by further comprising pattern readout means (30) for reading out at least one display pattern stored in a storage medium (27, 29), image display control means (30, ST10) for supplying the at least one display pattern read out by the pattern readout means (30) to the image display means (35), together with the image photographed by the photographing means (20, 21, 22, 23, 24a, 24b), pattern information generating means (30) for generating pattern information specifying the at least one display pattern which the image display control means (30, ST10) supplies to the image display means (35), and pattern information supplying means (38) for supplying, to the printing apparatus through the communication medium, pattern information generated by the pattern information generating means (30).

According to this photographing apparatus, the pattern readout means (30) reads out at least one display pattern stored in the storage medium (27, 29). The image display control means (30, ST10) makes the image display means (35) display the display pattern read out by the pattern readout means (30), together with the image photographed by the photographing means (20, 21, 22, 23, 24a, 24b). After balancing the image with the display pattern, the user takes a photograph of the object. The photographed image supplying means (38) supplies the photographed image to the printing apparatus through the communication medium. The pattern information supplying means (38) supplies pattern information specifying the display pattern to the printing apparatus. Thus, the printing apparatus can be supplied with the image balanced with the display pattern and the pattern information.

In the above-described photographing apparatus, the image display control means (30, ST10) can create a composite image by combining the image photographed by the photographing means (20, 21, 22, 23, 24a, 24b) and the display pattern read out by the pattern readout means (30) with each other, and can supply the composite image to the image display means (35). In this case, the image display control means (30, ST10) combines the image photographed by the photographing means (20, 21, 22, 23, 24a, 24b) and the display pattern read out by the pattern readout means (30) into the composite image, supplies the composite image to the image display means (35). The image display means (35) displays the composite image in which the photographed image and the display pattern are well balanced.

Furthermore, in the above-described photographing apparatus, the photographed image supplying means (38) can extract a part which does not overlap the display pattern from the image which the image display control means (30, ST10) supplies to the image display means (35), and can supply the extracted part of the image to the printing apparatus. In this case, the photographed image supplying means (38) supplies, of the image of the object photographed after the image is balanced with the display pattern, only the part which does not overlap the display pattern to the printing apparatus through the communication medium. As a result, the amount of data which the photographed image supplying means (38) supplies to the printing apparatus through the communication medium is reduced, and the time required for the supply of data is reduced accordingly.

The above-described photographing apparatus may further comprise display pattern selecting means for selecting a display pattern from the at least one display pattern stored in the storage medium (27, 29) and supplying the selected display pattern to the pattern readout means (30). In this case, the display pattern selecting means selects any display pattern from the at least one display pattern stored in the storage medium (27, 29), and supplies the selected display pattern to the pattern readout means (30). Thus, the user can select the desired pattern.

According to the fourth aspect of the present invention having the above-described object, there is provided a photographing apparatus comprising photographing means (20, 21, 22, 23, 24a, 24b) connectable to a printing apparatus via a communication medium and provided for photographing an image of an object to be photographed, image display means (35) for displaying the image photographed by the image photographing means (20, 21, 22, 23, 24a, 24b), image fetching means (30, ST13) for fetching the image photographed by the photographing means (20, 21, 22, 23, 24a, 24b), image storing means (27) for storing the image fetched by the image fetching means (30, ST13), and photographed image supplying means (38) for supplying the image stored in the image storing means (27) to the printing apparatus, characterized in that:

the photographing apparatus further comprises photographed image processing means (30) for processing the image stored in the image storing means (27) and supplying the processed image to the image display means (35), and pattern readout means (30) for reading out at least one display pattern stored in a storage medium (27, 29);

the image display means (35) displays the at least one display pattern read out by the pattern readout means (30), together with the image processed by the photographed image processing means (30); and the photographed image supplying means (38) supplies the image processed by the photographed image processing means (30) to the printing apparatus through the communication medium.

In this photographing apparatus, the pattern readout means (30) reads out at least one display pattern stored in the storage medium (27, 29). The image display means (35) displays the display pattern read out by the pattern readout means (30), together with the image stored in the image storing means (27). The user balances the image with the display pattern and processes the image through the use of the photographed image processing means (30). The photographed image supplying means (38) supplies the image processed by the photographed image processing means (30) to the printing apparatus through the communication medium. Consequently, the user can attain the image balanced with the display pattern and processed by the photographed image processing means (30).

Moreover, in the above-described photographing apparatus, the photographed image processing means (30) may supply the image stored in the image storing means (27) to the image display means (35) after subjecting the image to one of a minification, an enlargement and a change in display position. In this case, the photographed image processing means (30) minifies/enlarges the image stored in the image storing means (27), or changes the display position of the image. In this manner, the user can balance the image with display pattern and process the image.

Further, in the above-described photographing apparatus, the photographing apparatus may further comprise processing signal receiving means (38) for receiving an image processing signal supplied from the printing apparatus through the communication medium, and the photographed image processing means (30) can process the image stored in the image storing means (27), in response to the image processing signal received by the processing signal receiving means (38). In this case, the processing signal receiving means (38) receives the image processing signal supplied from the printing apparatus through the communication medium. In response to the image processing signal received by the processing signal receiving means (38), the photographed image processing means (30) processes the image stored in the image storing means (27). Thus, the user can control the photographing apparatus via the printing apparatus and can give the instruction to process the image balanced with the display pattern to the photographing apparatus via the printing apparatus.

The above-described photographing apparatus may further comprise request signal receiving means (38) for receiving a print request signal supplied from the printing apparatus through the communication medium, and the image supply control means (30) can supply the image processed by the image processing means (30) to the photographed image supplying means (38), in response to the print request signal received by the request signal receiving means (38). In this case, the request signal receiving means (38) receives the print request signal supplied from the printing apparatus through the communication medium. In accordance with the print request signal received by the request signal receiving means (38), the image supply control means (30) supplies the image processed by the image processing means (30) to the photographed image supplying means (38). Thus, the user can control the photographing apparatus via the printing apparatus and can supply a request for transmission of the image processed by the image processing means (30) to the photographing apparatus via the printing apparatus.

According to the fifth aspect of the present invention having the aforementioned object, there is provided a photographing apparatus comprising a communication unit (38) connectable to a printing apparatus via a communication medium, for performing communications with the printing apparatus, a photographing section (20, 21, 22, 23, 24a, 24b) for photographing an image of an object to be photographed, a display unit (35) for displaying the photographed image, a trigger generation unit (31) for generating a signal representing an instruction to fetch the photographed image, a storage unit (29) for storing a display pattern, an image storing unit (27) for storing the photographed image, and a control unit (30) for controlling the communication unit (38), the photographing section (20, 21, 22, 23, 24a, 24b), the display unit (35), the trigger generation unit (31), the storage unit (29) and the image storing unit (27), characterized in that:

the control unit (30) controls the photographing section (20, 21, 22, 23, 24a, 24b) to photograph the image of the object;

the control unit (30) combines the photographed image and the display pattern stored in the storage unit (29) into a composite image, and controls the display unit (35) to display the composite image;

the control unit (30) controls the image storing unit (27) to store the photographed image, in response to the signal generated by the trigger generation unit (31); and the control unit (30) controls the communication unit (38) to send to the printing apparatus the image stored in the image storing unit (27) and pattern information specifying the display pattern combined with the image.

According to this photographing apparatus, the display unit (35) displays the display pattern stored in the storage unit (29), together with the image photographed by the photographing section (20, 21, 22, 23, 24a, 24b). The user operates the trigger generating unit (31) and instructs the photographing apparatus to fetch the image. In response to the image fetching instruction, the image storing unit (27) stores the photographed image. The communication unit (38) supplies the image stored in the image storing unit (27) and the pattern information to the printing apparatus through the communication medium. Thus, the printing apparatus can be supplied with the image balanced with the display pattern and the pattern information.

According to the sixth aspect of the present invention having the aforementioned object, there is provided a printing apparatus comprising decoration pattern storing means (46) connectable to a photographing apparatus through a communication medium and provided for storing a decoration pattern, image receiving means (45) for receiving an image supplied from the photographing apparatus, image combining means (40, W9) for combining the image received by the image receiving means (45) and the decoration pattern stored in the decoration pattern storing means (46) with each other, thereby creating a composite image, and printing means (47) for printing the composite image created by the image combining means (40, W9), characterized in that:

the printing apparatus further comprises pattern information generating means (45) for generating pattern information specifying the decoration pattern, and decoration pattern readout means (40) for reading out from the decoration pattern storing means (46) the decoration pattern specified by the pattern information generated by the pattern information generating means (45); and the image combining means (40, W9) combines the image received by the image receiving means (45) and the decoration pattern read out by the decoration pattern readout means (40) with each other.

According to this printing apparatus, the image receiving means (45) receives the image supplied from the photographing apparatus through communication medium. The pattern information generating means (45) generates pattern information specifying the decoration pattern. The decoration pattern readout means (40) reads out from the decoration pattern storing means (46) the decoration pattern specified by the pattern information generated by the patter information generating means (45). The image combining means (40, W9) combines the image received by the image receiving means (45) and the decoration pattern stored in the decoration pattern storing means (46) with each other, thereby creating a composite image. The printing means (47) prints the composite image created by the image combining means (40, W9). Consequently, the user can attain the composite image in which the photographed image and the decoration pattern are well balanced.

Further, the above-described printing apparatus may further comprise pattern supplying means (45) for supplying a display pattern having the same shape as the decoration pattern to the photographing apparatus through the communication medium. In this case, the pattern supplying means (45) can supply a display pattern whose shape is the same as that of the decoration pattern to the photographing apparatus through the communication medium. Therefore, even if the photographing apparatus does not have any display pattern stored therein, a display pattern can be supplied thereto.

In the above-described printing apparatus, the image combining means (40, W9) can superimpose the decoration pattern read out by the decoration pattern readout means (40) on a blank contained in the image received by the image receiving means (45). In this case, the image receiving means (45) receives, from the photographing apparatus through the communication medium, the image from which the part overlapping a display pattern has been removed. The image combining means (40, W9) superimposes the decoration pattern read out by the decoration pattern readout means (40) on the blank contained in the image. Under those conditions, the amount of data which the image receiving means (45) receives from the photographing apparatus is reduced, and the time required for the supply of data is reduced accordingly.

The above-described printing apparatus may further comprise decoration pattern creating means (40) for creating the decoration pattern from the image received by the image receiving means (45) and for storing the created decoration pattern in the decoration pattern storing means (46). In this case, the decoration pattern creating means (40) creates the decoration pattern from the image received by the image receiving means (45), and stores the created decoration pattern in the decoration pattern storing means (46). Using the decoration pattern creating means, the user can create the decoration pattern from the desired image sent from the photographing apparatus.

According to the seventh aspect of the present invention having the object described previously, there is provided a printing apparatus comprising decoration pattern storing means (46) connectable to a photographing apparatus via a communication medium and provided for storing a decoration pattern, image receiving means (45) for receiving an image supplied from the photographing apparatus, image combining means (40, W9) for combining the image received by the image receiving means (45) and the decoration pattern stored in the decoration pattern storing means (46) with each other, thereby creating a composite image, printing means (47) for printing the composite image created by the image combining means (40, W9), characterized in that:

the printing apparatus further comprises processing signal supplying means (45) for supplying an image processing signal representing an instruction to process the image to the photographing apparatus through the communication medium; and the image receiving means (45) receives from the photographing apparatus the image processed in response to the image processing signal supplied from the processing signal supplying means (45).

According to this photographing apparatus, the processing signal supplying means (45) supplies the image processing signal to the photographing apparatus through the communication medium. The image receiving means (45) receives from the photographing apparatus the image processed in response to the image processing signal which the processing signal supplying means (45) has supplied. The image combining means (40, W9) combines the image received by the image receiving means (45) and the decoration pattern stored in the decoration pattern storing means (46), thereby creating a composite image. The printing means (47) prints the composite image created by the image combining means (40, W9). Consequently, the user can attain the composite image in which the photographed image and the decoration pattern are well balanced.

The above-described printing apparatus may further comprise pattern supplying means (45) for supplying, to the photographing apparatus through the communication medium, a display pattern corresponding to the decoration pattern, image request means (40) for supplying to the photographing apparatus an image request signal representing a request for transmission of the image, and decoration pattern readout means (40) for reading out from the decoration pattern storing means (46) the decoration pattern which corresponds to the display pattern supplied from the pattern supplying means (45) to the photographing apparatus.

The image combining means (40, W9) can combine the image received by the image receiving means (45) and the decoration pattern read out by the decoration pattern readout means (40) with each other. In that case, the pattern supplying means (45) supplies a display pattern to the photographing apparatus through the communication medium. The user balances the image with the display pattern supplied to the photographing apparatus, and then processes the image. The image request means (40) supplies to the photographing apparatus the image request signal representing a request for transmission of the processed image. The image receiving means (45) receives the processed image from the photographing apparatus. The decoration pattern readout means (40) reads out from the decoration pattern storing means (46) the decoration pattern which corresponds to the display pattern supplied to the photographing apparatus. The image combining means (40, W9) combines the image received by the image receiving means (45) and the decoration pattern read out by the decoration pattern readout means (40) with each other, thereby creating a composite image. The printing means (47) prints the composite image created by the image combining means (40, W9). Thus, the user can attain the composite image in which the photographed image and the decoration pattern are well balanced.

According to the eighth aspect of the present invention having the object described previously, there is provided a printing apparatus comprising a communication unit (45) connectable to a photographing apparatus through a communication medium, for performing communications with the photographing apparatus, a storage unit (46) for storing a decoration pattern, a printing section (47) for printing an image, and a control unit (40) for controlling the communication unit (45), the storage unit (46) and the printing section (47), characterized in that:

the control unit (40) controls the communication unit (45) to receive from the photographing apparatus an image and pattern information specifying a display pattern corresponding to the decoration pattern;

the control unit (40) reads out from the storage unit (46) the decoration pattern specified by the pattern information received from the photographing apparatus;

the control unit (40) combines the decoration pattern read out from the storage unit (46) and the image received from the photographing apparatus with each other, thereby creating a composite image; and the control unit (40) controls the printing section (47) to print the composite image.

According to this printing apparatus, the control unit (40) controls the communication unit (45) to receive, from the photographing apparatus through the communication medium, an image and pattern information specifying the display pattern corresponding to the decoration pattern. The control unit (40) reads out from the storage unit (46) the decoration pattern specified by the pattern information which the communication unit (45) has received from the photographing apparatus. The control unit (40) combines the read-out decoration pattern and the image received by the communication unit (45) with each other, thereby creating a composite image. The printing section (47) prints the composite image as created. Thus, the user can attain the composite image in which the photographed image and the decoration pattern are well balanced.

According to the ninth aspect of the present invention having the above-described object, there is provided a combining method for combining an image supplied from a photographing apparatus and a decoration pattern with each other, characterized by comprising:

an image receiving step (W5) of receiving from the photographing apparatus an image photographed after the image is balanced with a display pattern;

a display pattern specifying step (W5) of specifying the display pattern with which the image has been balanced;

a decoration pattern creating step (W6) of creating a decoration pattern corresponding to the display pattern specified by the display pattern determining step (W5); and a combining step (W9) of combining the image received by the image receiving step (W5) and the decoration pattern created by the decoration pattern creating step (W6) with each other, thereby creating a composite image.

According to this combining method, the image of the object, balanced with a decoration pattern and then photographed by the photographing apparatus, is received by the image receiving step (W5). The display pattern with which the image has been balanced is specified by the display pattern specifying step (W5). By the combining step (W9), the image received by the image receiving step (W5) and the decoration pattern created by the decoration pattern creating step (W6) are combined with each other, whereby a composite image is created. In the composite image thus created, the image and the decoration pattern are well balanced.

According to the tenth aspect of the present invention having the above-described object, there is provided a combining method for combining an image supplied from a photographing apparatus and a decoration pattern with each other, characterized by comprising:

an image processing step (S106) of balancing an image photographed by the photographing apparatus with a decoration pattern and processing the image;

an image receiving step (S108) of receiving the image processed by the image processing step (S106) from the photographing apparatus; a display pattern specifying step (S103) of specifying the display pattern with which the image has been balanced;

a decoration pattern creating step (S103) of creating a decoration pattern corresponding to the display pattern specified by the display pattern determining step (S103); and a combining step (S109) of combining the image received by the image receiving step (S108) and the decoration pattern created by the decoration pattern creating step (S103) with each other, thereby creating a composite image.

According to this combining method, the image balanced with a decoration pattern and then processed by the image processing step (S106) is received by the image receiving step (S108). The display pattern with which the image has been balanced is specified by the display pattern specifying step (S103). By the combining step (S109), the image received by the image receiving step (S108) and the decoration pattern created by the decoration pattern creating step (S103) are combined with each other, whereby a composite image is created. In the composite image thus created, the image and the decoration pattern are well balanced.

BEST MODE FOR CARRYING OUT THE INVENTION

Embodiments of the present invention will now be described with reference to the accompanying drawings.

Figure 1:
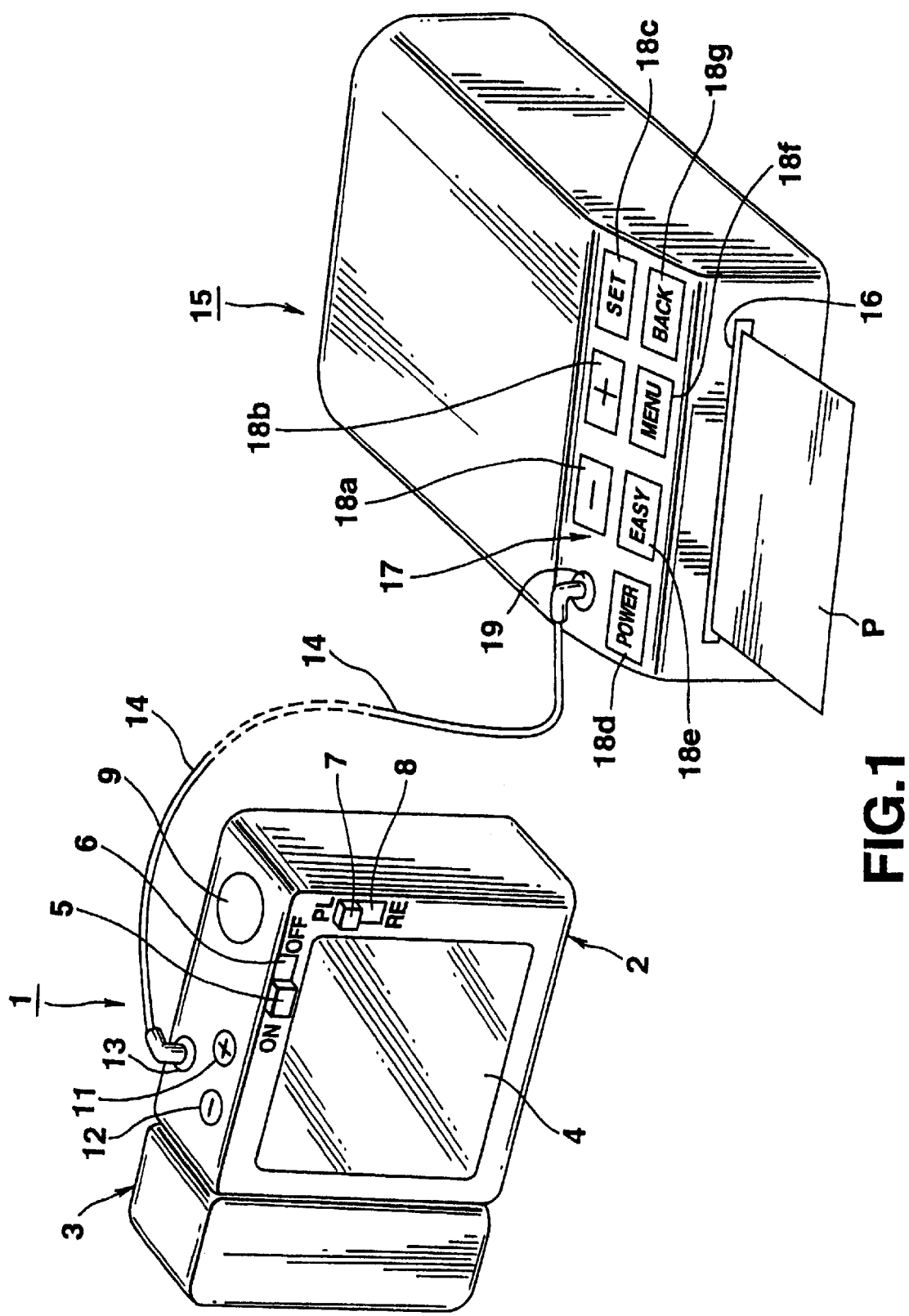
FIG. 1 is a diagram showing perspective views of a printing apparatus 15 and a digital still camera 1 connected thereto according to an embodiment of the present invention.

FIG. 1 is a diagram showing perspective views of a digital still camera and a printing apparatus in a printing system according to the first embodiment of the present invention. The digital still camera and the printing apparatus illustrated in FIG. 1 are in the state of being connected to each other via a communication cable.

Figure 2A:
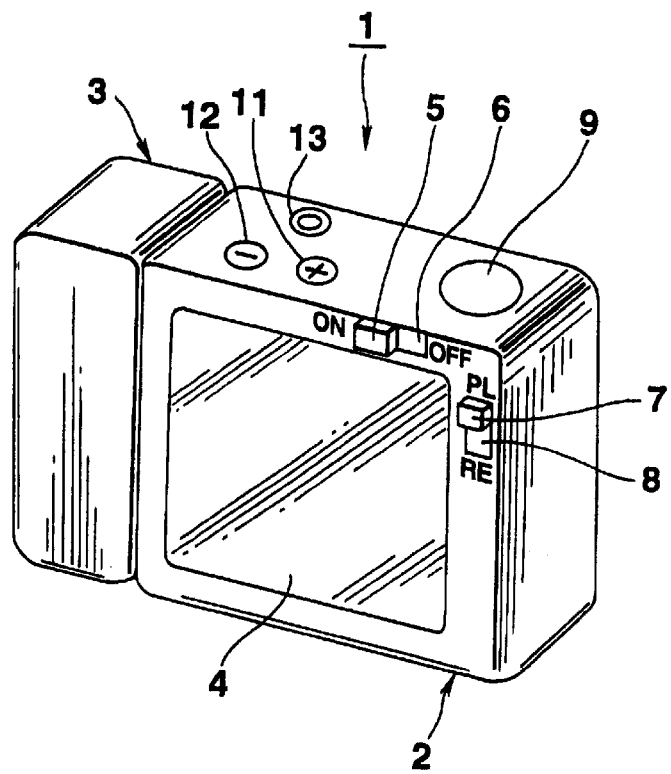
FIG. 2A is a diagram showing a perspective view of the digital still camera 1 when seen from its back side.
Figure 2B:
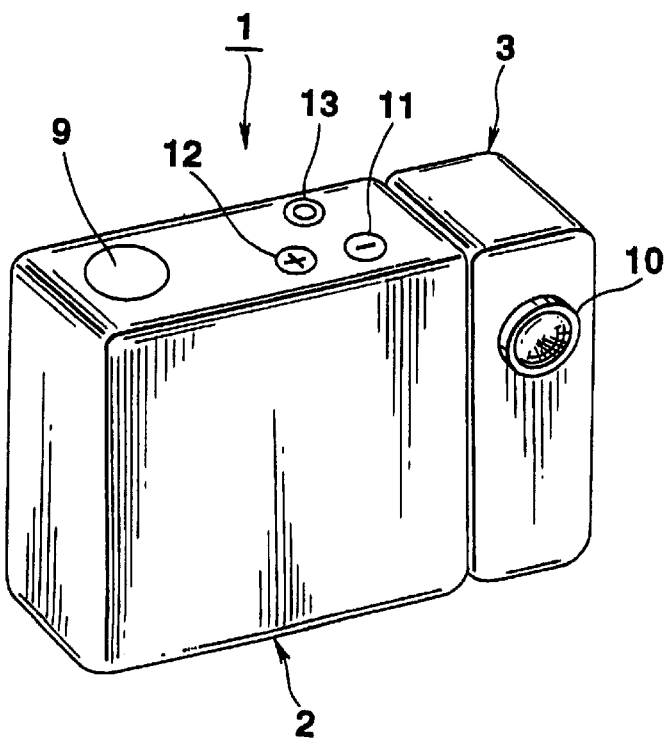
FIG. 2B is a diagram showing a perspective view of the digital still camera 1 when seen from its front side.

The structure of the digital still camera 1 will now be described. FIG. 2A is a diagram showing a perspective view of the digital still camera 1 when seen from its rear side (the operation side). FIG. 2B is a diagram showing a perspective view of the digital still camera 1 when seen from its front side. As seen in FIGS. 2A and 2B, the digital still camera 1 has a camera main body 2 and a lens unit section 3.

As illustrated in FIG. 2A, a viewfinder 4 is arranged in the center of the rear (back) side of the camera main body 2. An ON switch 5 and an OFF switch 6 are arranged above the viewfinder 4. A PL key 7 and a RE key 8 are arranged on the right of the viewfinder 4.

The viewfinder 4 is a color LCD (Liquid Crystal Display). In an image recording mode, the viewfinder 4 displays an image of the object which has been photographed through a lens 10. In an image playback mode, the viewfinder 4 displays an image of the object which has been stored in an internal image memory which will be described later.

The ON switch 5 is used to switch on the digital still camera 1, while the OFF switch 6 is used to switch off the digital still camera 1. The ON switch 5 and the OFF switch 6 form a toggle switch. One switch, once pressed, remains as is until the other switch is pressed.

The PL key 7 is used to operate the digital still camera 1 in the image playback mode, while the RE key 8 is used to operate the digital still camera 1 in the image recording mode. The PL key 7 and the RE key 8 form a toggle switch. One switch, once pressed, remains as is until the other switch is pressed.

As shown in FIG. 2A, a shutter release button 9, a "+" key 11, a "−" key 12 and a communication terminal 13 are arranged on the top of the camera main body 2.

The shutter release button 9 is a switch to have the internal image memory which will be described later store an image of the object which the digital still camera 1 photographs while operating in the image recording mode.

The "+" key 11 and the "−" key 12 are used to select from the images stored in the internal image memory an image to be displayed on the viewfinder 4 while the digital still camera 1 is operating in the image playback mode. When the "−" key 12 is pressed, the viewfinder 4 changes the currently displayed one of the images stored in the internal memory to the preceding image.

As illustrated in FIG. 1, the communication terminal 13 is a jack in which the connection plug, provided at one end of a communication cable 14, is inserted to connect the digital still camera 1 and a printing apparatus 15 to each other via the communication cable 14.

Figure 3A:
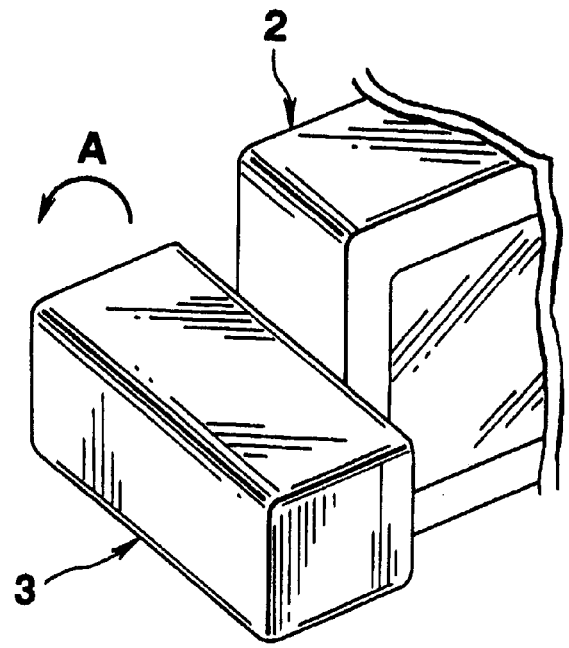
FIG. 3A is a diagram showing a perspective view of the digital still camera 1 in the state wherein its lens unit section 3 has been rotated forward.
Figure 3B:
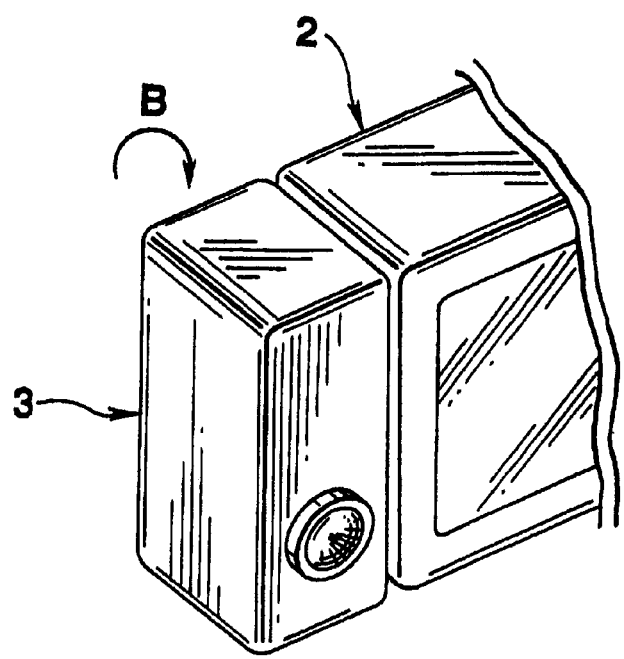
FIG. 3B is a diagram showing a perspective view of the digital still camera 1 in the state wherein its lens unit section 3 has been rotated backward.

As depicted in FIG. 2B, a lens 10 is arranged on the front side of the lens unit section 3. The lens unit section 3 is rotatable in the direction of an arrow A (i.e., backward) through an angle of 90 degrees as shown in FIG. 3A, and is rotatable in the direction of an arrow B (i.e., forward) through an angle of 180 degrees as shown in FIG. 3B. An image of the object, photographed under the condition wherein the lens unit section 3 has been rotated (forward) by 180 degrees in the direction of the arrow B, is displayed as an mirror image (a reverse image) on the viewfinder 4. Even in this case, however, the digital still camera 1 discriminates the state of the image being displayed as a mirror image, in accordance with the angle of the lens unit 3 with respect to the camera main body 2. The digital still camera 1 corrects the mirror image to an erect image, and stores the erect image automatically.

Figure 4:
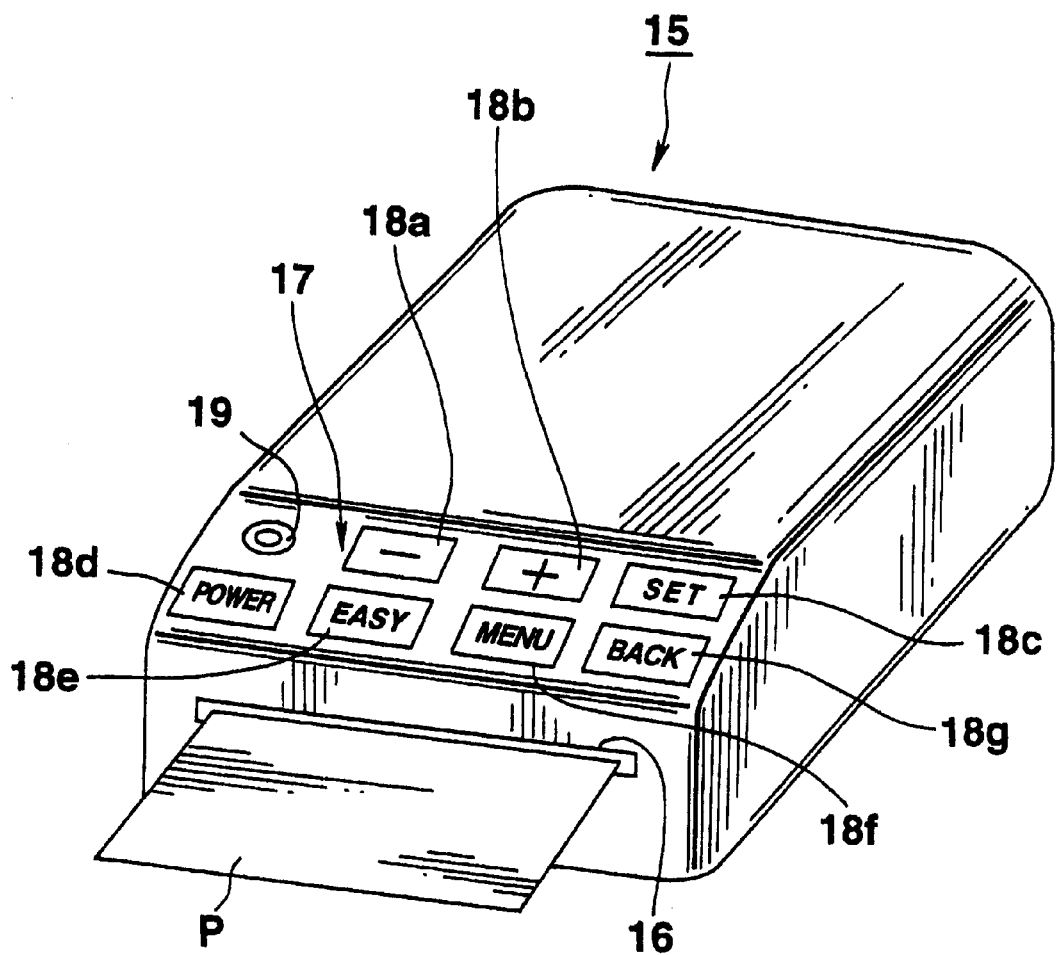
FIG. 4 is a diagram showing a perspective view of the printing apparatus according to the above-mentioned embodiment of the present invention.

Next the structure of the printing apparatus 15 will be described. As shown in FIG. 4, the printing apparatus 15 has a sheet insertion/discharge slot 16 on its front side. The printing apparatus 15 fetches a sheet of recording paper P through the sheet insertion/discharge slot 16 when it starts printing, and discharges the sheet of recording paper P through the insertion/discharge slot 16 when it finishes printing.

As shown in FIG. 4, an operation panel 17 is arranged on the forward upper surface of the printing apparatus 15. The operation panel 17 has seven operation keys (a "−" key 18a, a "+" key 18b, a "SET" key 18c, a "POWER" key 18d, an "EASY" key 18e, a "MENU" key 18f and a "BACK" key 18g) serving as push-button switches, and a communication terminal 19.

The "POWER" key 18d is used to switch on the printing apparatus 15. The operation keys 18 (18a to 18c and 18e to 18g) except the "POWER" key 18d are used to designate one of the items on a selection menu displayed on the viewfinder 4 of the digital still camera 1 during a decoration pattern receiving process which will be described later.

The "−" key 18a and the "+" key 18b are used to change the currently designated item on the selection menu displayed on the viewfinder 4 of the digital still camera 1. When the "+" key 18b is pressed, the next item under the currently designated item is designated on the selection menu displayed on the viewfinder 4. The "SET" key 18c is used to select (determine as an item to be carried out) the designated item on the selection menu displayed on the viewfinder 4. The "MENU" key 18f is used to display a pattern selection menu on the viewfinder 4.

The communication terminal 19 is a jack in which the connection plug, provided at the other end of the communication cable 14, is inserted to connect the printing apparatus 15 and the digital still camera 1 to each other via the communication cable 14 as shown in FIG. 1.

The digital still camera 1 and the printing apparatus 15, having the above-described appearances and structures, will now be described in more detail, with reference to the block diagrams showing their circuitries.

Figure 5A:
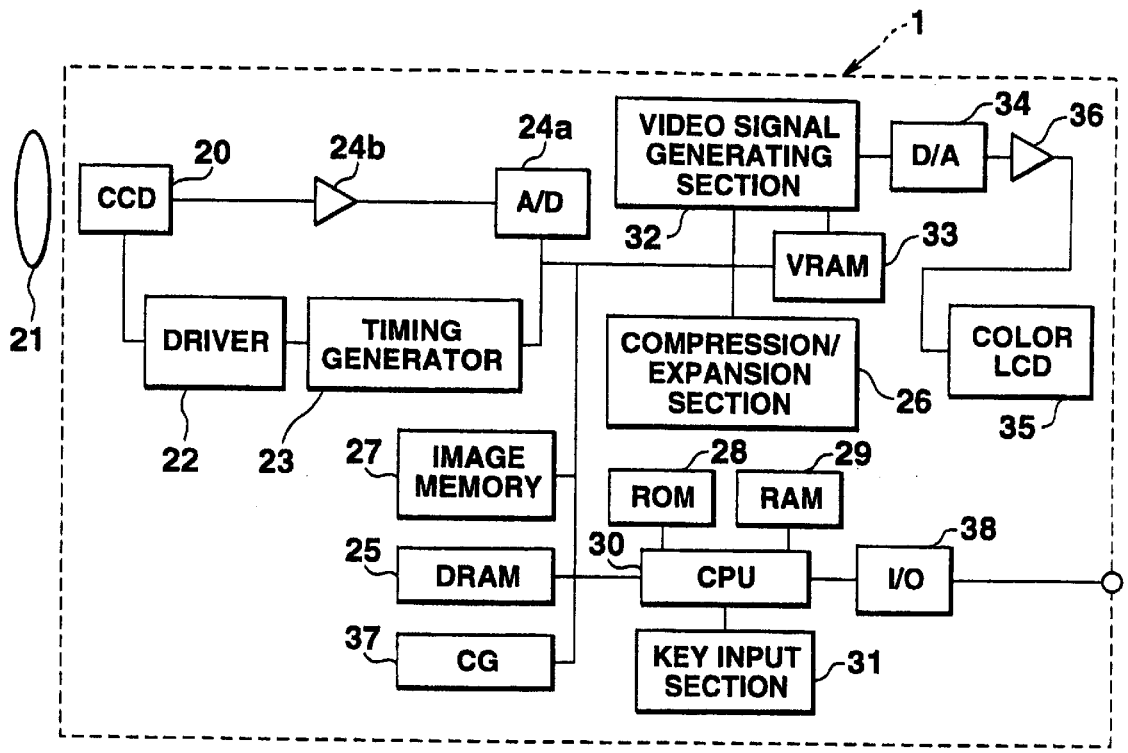
FIG. 5A is a block diagram illustrating the circuitry of the printing apparatus 15.
Figure 5B:
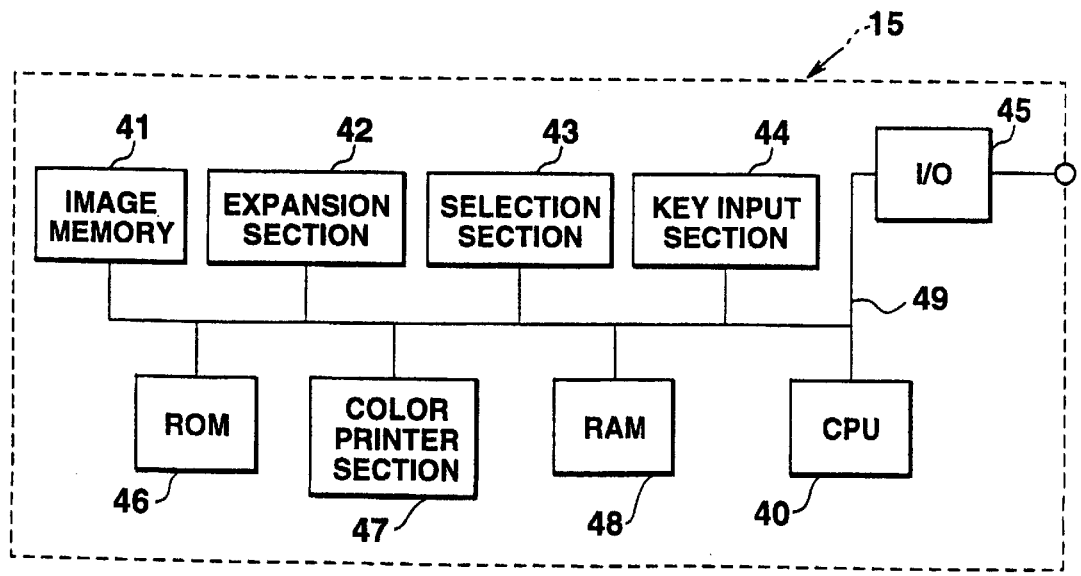
FIG. 5B is a block diagram illustrating the circuitry of the digital still camera 1.

FIG. 5A is a block diagram showing the circuitry of the digital still camera 1, while FIG. 5B is a block diagram showing the circuitry of the printing apparatus 15.

The structure of the digital still camera 1 illustrated in FIG. 5A will now be explained. The digital still camera 1 includes a CCD 20, a lens 21, a driver 22, a timing generator 23, an A/D converter 24a, an amplifier 24b, a DRAM 25, a compression/expansion section 26, an image memory 27, a ROM 28, a RAM 29, a CPU 30, a key input section 31, a video signal generating section 32, a VRAM 33, a D/A converter 34, a color LCD 35, an amplifier 36, a CG 37 and an I/O port 38.

The CCD 20 (charge-coupled device) has the structure wherein light receiving elements (photoelectric converter elements) having square apertures are arranged in a matrix pattern. The light receiving elements convert the light received through the apertures to an analog image signal, which is supplied to the AID converter 24a through the amplifier 24b.

The lens 21 forms an image of the object on the light receiving surface of the CCD 20.

The driver (driving circuit) 22 drives the CCD 20 in accordance with a timing signal which is supplied from the timing generator 23.

The timing generator 23 supplies the timing signal to the driver 22 under the control of the CPU 30.

The A/D (analog/digital) converter 24a converts the analog image signal supplied from the CCD 20 through the amplifier 24b to image data, and supplies the image data to the DRAM 25.

The amplifier 24b amplifies the image signal output from the CCD 20, and supplies the amplified signal to the A/D converter 24a.

The DRAM 25 stores the image data supplied from the A/D converter 24a.

The compression/expansion section 26 compresses the image data stored in the DRAM 25 by a coding process, and supplies the compressed image data to the image memory 27. By an encoding process, the compression/expansion section 26 expands the compressed image data stored in the image memory 27, and supplies the expanded image data to the VRAM 33.

The image memory 27 stores, by the amount corresponding to a plurality of frames, the compressed image data supplied from the compression/expansion section 26.

The ROM 28 stores the programs by which the CPU 30 controls the individual blocks included in the digital still camera 1 and by which the CPU 30 performs various processes.

The RAM 29 temporarily stores a display pattern sent from the printing apparatus 15 in a display pattern receiving process which will be described later. The RAM 29 temporarily stores arithmetic processing interim data (work data), etc. which the CPU 30 needs in order to execute the programs stored in the ROM 28.

The CPU 30 executes the display pattern receiving process, the image photographing process and the image sending process which will be described later, in accordance with the programs stored in the ROM 28.

The key input section 31 supplies to the CPU 30 an input signal corresponding to the key operation performed by a user. The key input section 31 corresponds to the variety of switches (the switches 5 to 8, 9, 11 and 12) illustrated in FIG. 2A.

The video signal generating section (video encoder) 32 generates a digital video signal by adding a sync signal and/or the like to the display image data stored in the VRAM 33, and supplies the digital video signal to the D/A converter 34.

The VRAM 33 stores the display image data generated by the CPU 30 and the compression/expansion section 26.

The D/A (digital/analog) converter 34 converts the digital video signal supplied from the video signal generating section 32 to an analog video signal, and supplies the analog video signal to the color LCD 35.

The color LCD 35 displays an image according to the analog video signal supplied from the D/A converter 34 through the amplifier 36. The color LCD 35 corresponds to the viewfinder 4 illustrated in FIG. 2A.

The amplifier 36 amplifies the video signal output from the D/A converter 34, and supplies the amplified video signal to the color LCD 35.

The CG (character generator) 37 stores character data and cursor data, etc. which the color LCD 35 requires to display characters such as those to explain the way of manipulation.

The I/O (input/output) port 38 is the interface which sends and receives image data and a decoration pattern, etc. in the case where the digital still camera 1 and the printing apparatus 15 are connected to each other via the communication cable 14 as shown in FIG. 1.

The structure of the printing apparatus illustrated in FIG. 5B will now be described. The printing apparatus 15 includes a CPU 40, an image memory 41, an expansion section 42, a selection section 43, a key input section 44, an I/O port 45, a ROM 46, a color printer section 47, a RAM 48 and a bus 49.

The CPU 40 executes the display pattern sending process and the combining and printing processes which will be described later, in accordance with programs stored in the ROM 46.

The image memory 41 stores the image data supplied from the expansion section 42. The image memory 41 has three storage areas. Each storage area stores image data of a color component corresponding to one of three colors of yellow (Y), magenta (M) and cyan (C).

The expansion section 42, which has a known image expanding function such as a JPEG (Joint Photographic Expert Group) system, expands a compressed print decoration pattern stored in the ROM 46 which will be described later, and supplies the expanded print decoration pattern to the RAM 48. The expansion section 42 expands the image data which the I/O port 45 receives from the digital still camera 1, and supplies the expanded image data to the image memory 41.

In accordance with a trigger signal supplied from the key input section 44, the selection section 43 inputs the corresponding selection command to the CPU 40.

The key input section 44 supplies to the selection section 43 a trigger signal according to the key operation performed by the user. The key input section 44 corresponds to the set of operation keys 18 (18a to 18g) illustrated in FIG. 4.

The I/O port 45 is the interface which sends and receives image data and a display pattern, etc. under the control of the CPU 40 in the case where the printing apparatus 15 and the digital still camera 1 are connected to each other.

Figure 6:
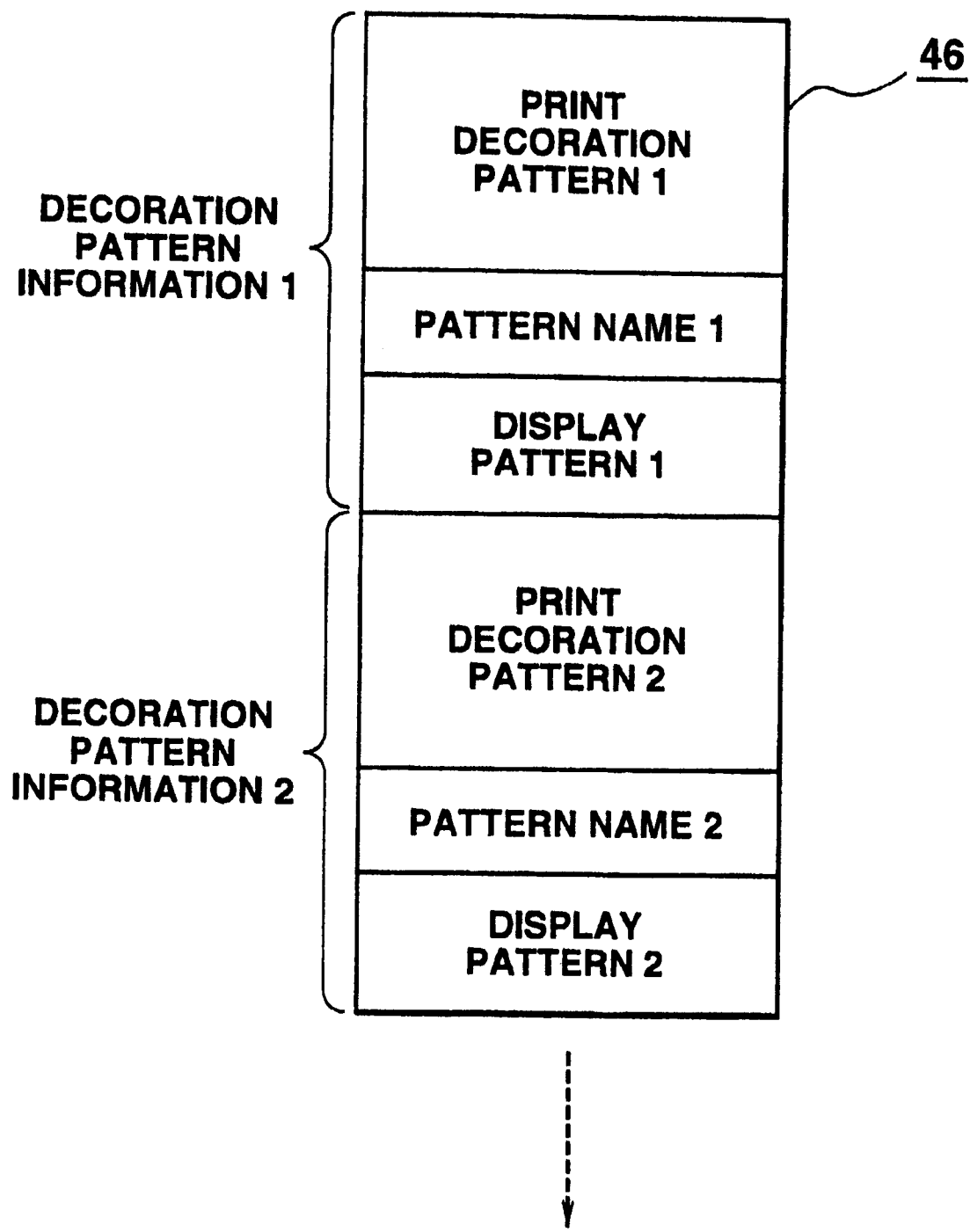
FIG. 6 is a diagram showing the data map of decoration pattern information stored in a ROM 46 of the printing apparatus 15.

The ROM 46 stores the programs by which the CPU 40 controls the individual blocks included in the printing apparatus 15 and by which the CPU 40 performs various processes. The ROM 46 stores decoration pattern information such as that shown in FIG. 6 and which are used in the combining and printing processes and the display pattern sending process. As shown in FIG. 6, decoration pattern information 1 contains a print decoration pattern 1, a pattern name 1 and a display pattern 1, while decoration pattern information 2 contains a print decoration pattern 2, a pattern name 2 and a display pattern 2. The ROM 46 stores also other decoration pattern information.

The print decoration patterns are data representing figures for being combined during the combining and printing processes which will be described later with the image data sent from the digital still camera 1, and are stored in a compressed state in the ROM 46.

The pattern names are data representing characters specifying their corresponding decoration patterns.

The display patterns are data representing figures for being sent to the digital still camera 1 in the display pattern sending process which will be described later. Each print decoration pattern and its corresponding display pattern represent figures having substantially the same shape.

Figure 7A:
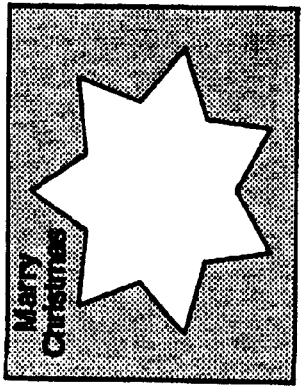
FIGS. 7A, 7C, 7E and 7G are diagrams exemplifying print decoration patterns stored in the ROM 46 of the printing apparatus 15.
Figure 7C:
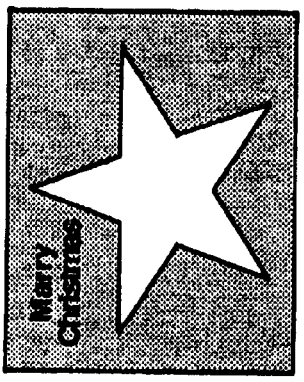
Figure 7E:
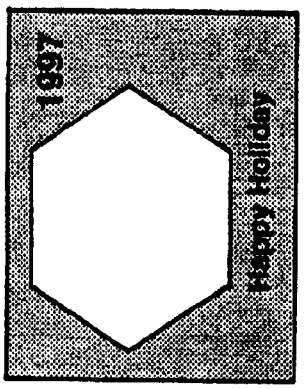
Figure 7G:
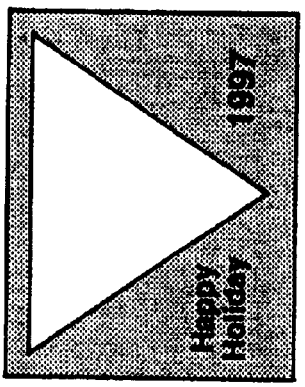
Figure 7B:
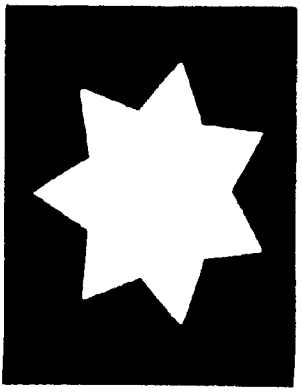
FIGS. 7B, 7D, 7F and 7H are diagrams exemplifying decoration patterns stored in the ROM 46 of the printing apparatus 15.

FIGS. 7A to 7H are diagrams exemplifying the print decoration patterns and the display patterns, all being stored in the ROM 46. For example, the star-shaped figure illustrated as a blank region in FIG. 7A is stored in the ROM 46 as the print decoration pattern 1 shown in FIG. 6. The print decoration pattern 1 is image data for the VGA (Video Graphics Array) (640×480) to print the star-shaped figure, and is stored in the ROM 46 after being compressed by the JPEG system. The star-shaped figure illustrated as a blank region in FIG. 7B is stored in the ROM 46 as the display pattern 1 shown in FIG. 6. The star-shaped blank regions shown in FIGS. 7A and 7B have the same shape. The pattern name 1 shown in FIG. 6 is stored in the ROM 46 as character string data "STAR 7", which specifies the decoration pattern 1 and the display pattern 1 both having a star shape. The decoration pattern information 1 contains the print decoration pattern 1 illustrated in FIG. 7A, the pattern name 1 or "STAR7", and the display pattern 1 illustrated in FIG. 7B.

Figure 7D:
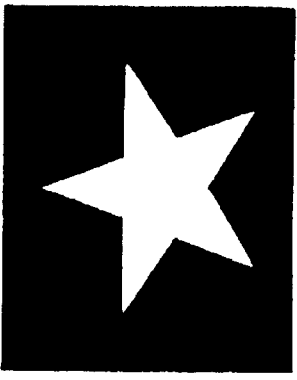
Figure 7F:
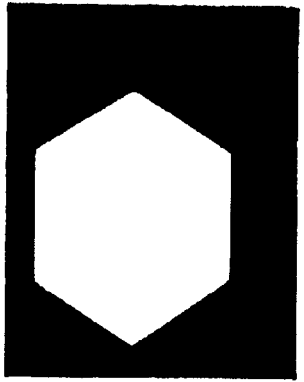
Figure 7H:
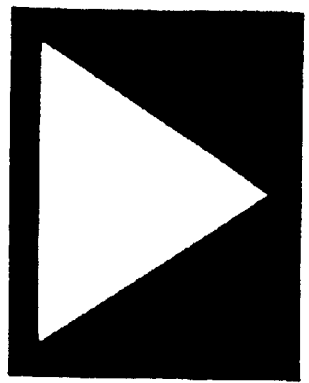

Similarly the decoration pattern information 2 contains the print decoration pattern 2 illustrated in FIG. 7C, the pattern name 2 or "STAR5", and the decoration pattern 2 illustrated in FIG. 7D. Decoration pattern information 3 contains a print decoration pattern 3 illustrated in FIG. 7E, a pattern name 3 or "HEX6", and a display pattern 3 illustrated in FIG. 7F. Decoration pattern information 4 contains a print decoration pattern 4 depicted in FIG. 7G, a pattern name 4 or "TRI", and a display pattern 4 depicted in FIG. 7H.

Referring again to FIG. 4, the color printer section 47 is a printer engine section, which includes a DC motor, a stepping motor, a motor driver, a print head and various sensors, for example. The color printer section 47 prints the image data stored in the image memory 41 under the control of the CPU 40.

The RAM 48 temporarily stores the image data sent from the digital still camera 1. The RAM 48 temporarily stores the arithmetic processing interim data (work data), etc. which the CPU 40 needs in order to execute the programs stored in the ROM 46.

The bus 49 is a transfer path which connects the CPU 40 and the individual blocks together and through which data, etc. are transmitted between the CPU 40 and the individual blocks.

The display pattern sending process of the printing apparatus, the photographing process of the digital still camera and the combining and printing processes of the printing apparatus in the printing system according to the first embodiment of the present invention, will now be described with reference to the drawings.

Explained first are the display pattern sending process by which the printing apparatus 15 sends a display pattern to the digital still camera 1, and the display pattern receiving process by which the digital still camera 1 receives a display pattern.

The user couples the communication cable 14 to the communication terminal 19 and the communication terminal 13 as shown in FIG. 1, thereby connecting the printing apparatus 15 and the digital still camera both of which have not yet been switched on. Then the user presses the "POWER" key 18d of the printing apparatus 15 and the ON switch 5 of the digital still camera 1. Upon pressing the "POWER" key 18d, the printing apparatus 15 is switched on, and the CPU 40 starts the initial processing such as memory checking, etc. Meanwhile, upon pressing the ON switch 5, the digital still camera 1 is switched on, and the CPU 30 starts the initial processing such as memory checking, etc.

Figure 8A:
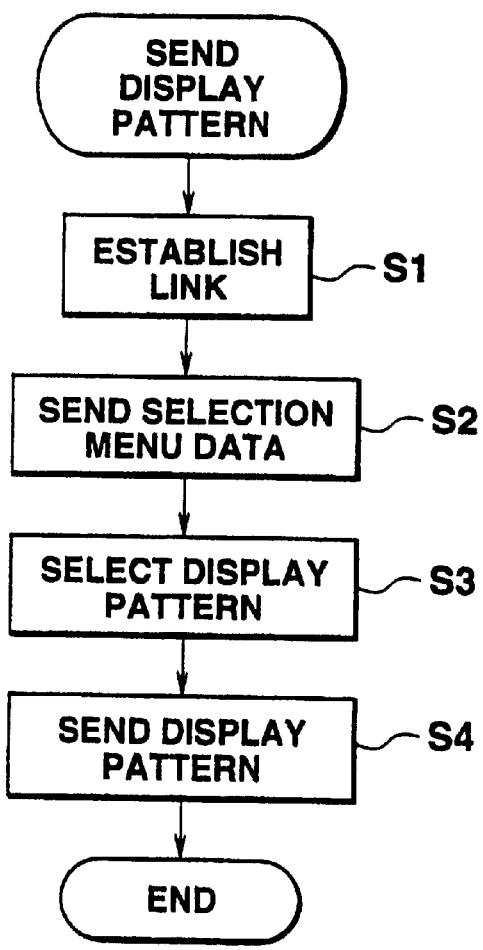
FIG. 8A is a flowchart explaining a display pattern sending process performed by the printing apparatus 15.
Figure 8B:
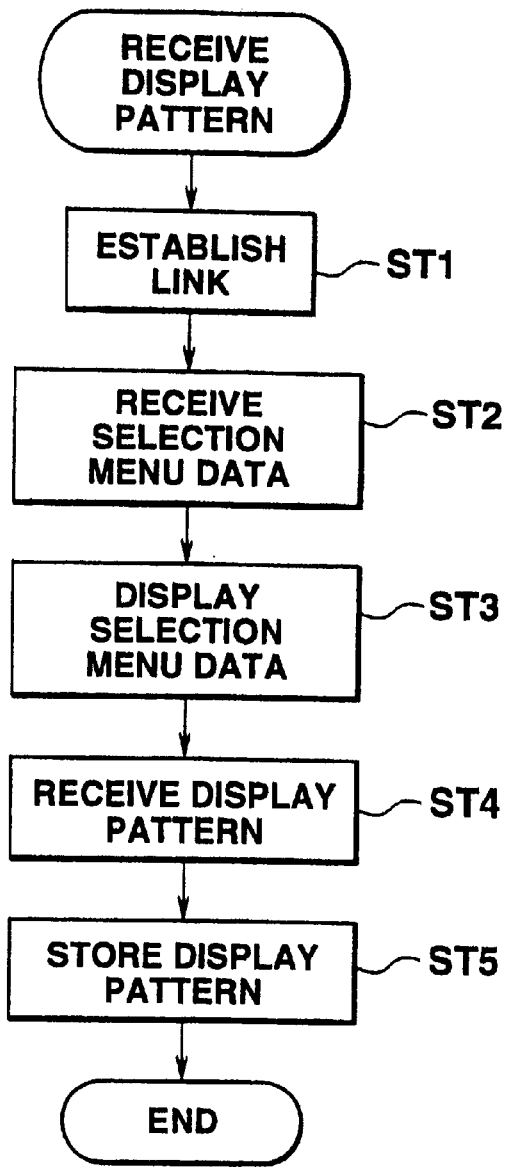
FIG. 8B is a flowchart explaining a decoration pattern receiving process performed by the digital still camera 1.

After finishing the initial processing, the CPU 40 in the printing apparatus 15 starts the display pattern sending process shown in FIG. 8A. Meanwhile, the CPU 30 in the digital still camera 1 starts the display pattern receiving process shown in FIG. 8B after finishing the initial processing.

Figure 9:
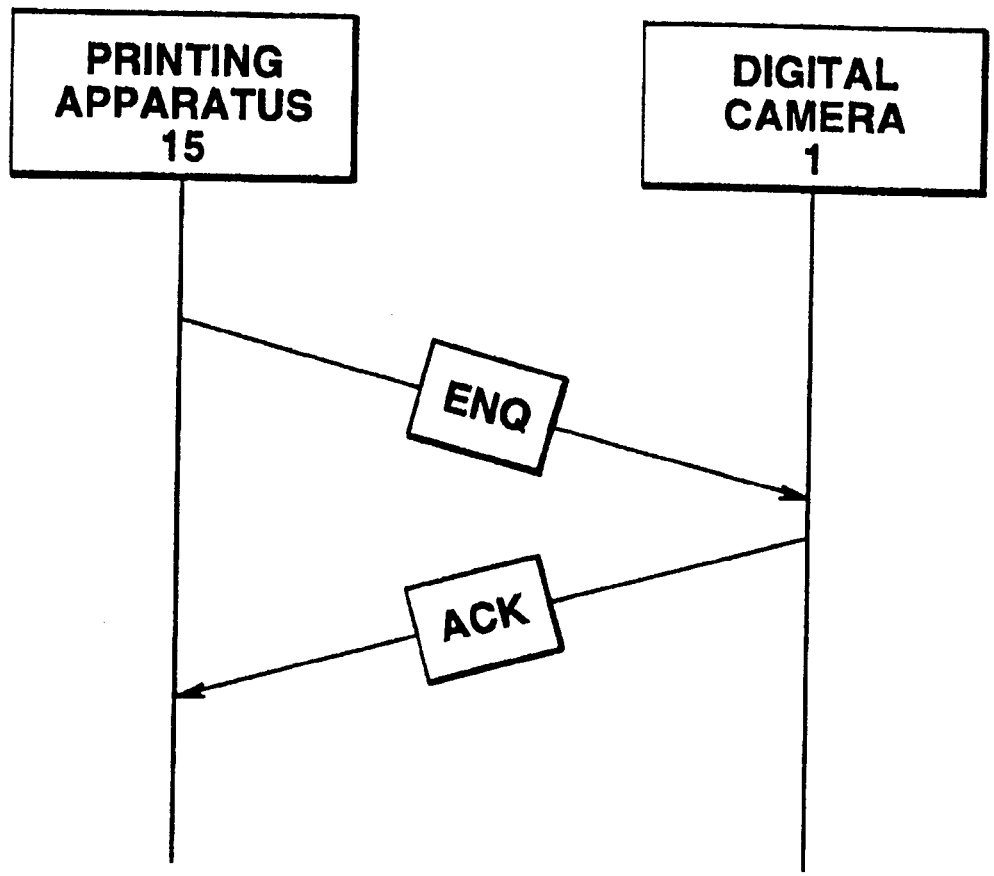
FIG. 9 is a diagram showing how a data link is established between the printing apparatus 15 and the digital still camera 1.

Control data, etc. are transmitted between the CPU 40 and the CPU 30 through the I/O port 45 and the I/O port 38 so that a data link is established (step S1, step ST1). The data link is established in the following manner. First, as shown in FIG. 9, the printing apparatus 15 supplies transmission request data (ENQ) to the digital still camera 1. Having received the transmission request data (ENQ), the digital still camera 1 sends back acknowledgment data (ACK) to the printing apparatus 15. The data link is established when the printing apparatus 15 has received the acknowledgment data (ACK) from the digital still camera 1.

Upon pressing the "MENU" key 18f, the input section 44 generates a trigger signal representing an instruction to display a pattern selection menu, and inputs a selection command to the CPU 40 through the selection section 43.

In response to the selection command, the CPU 40 of the printing apparatus 15 reads out the pattern names from the ROM 46 which stores the decoration pattern information shown in FIG. 6, and processes the read-out pattern names into pattern selection menu data. The CPU 40 sends the pattern selection menu data to the digital still camera 1 through the I/O port 45 (step S2). The CPU 30 of the digital still camera 1 receives the pattern selection menu data through the I/O port 38 (step ST2), and stores the received data in the DRAM 25. The CPU 30 processes the pattern selection menu data stored in the DRAM 25, and stores the processed data in the VRAM 33. The CPU 30 controls the video signal generating section 32, and makes the color LCD 35 display the pattern selection menu such as that illustrated in FIG. 10 in accordance with the pattern selection menu data stored in the VRAM 33 (step ST3).

Figure 10:
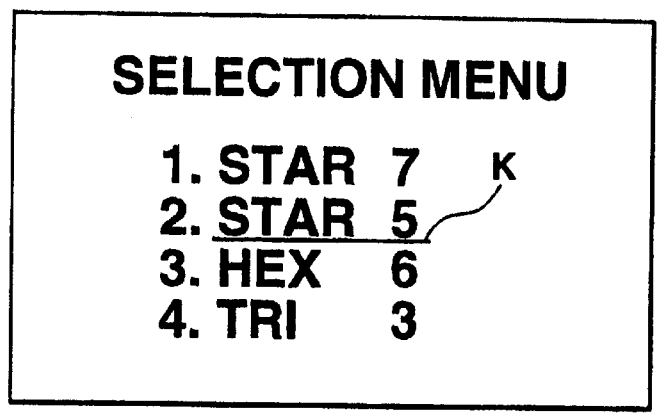
FIG. 10 is a diagram illustrating a pattern selection menu displayed on a color LCD 35.

Then, in order to select the desired display pattern from the pattern selection menu displayed on the color LCD 35, the user moves a cursor K illustrated in FIG. 10 upward or downward, and designates one item on the pattern selection menu with the cursor K. After the user has moved the cursor K to the item "STAR5" as shown in FIG. 10, he/she presses the "SET" key 18c. Upon pressing the "SET" key 18c, the key input section 44 generates a trigger signal to select the pattern corresponding to the "STAR5", and inputs a selection command to the CPU 40 through the selection section 43 (step S3).

In response to the selection command, the CPU 40 of the printing apparatus 15 reads out the pattern name 2 (STAR5) and the display pattern 2 (FIG. 7D) from the ROM 46 which stores the decoration pattern information shown in FIG. 6, and sends the read-out name and pattern to the digital still camera 1 through the I/O port 45 (step S4). The CPU 30 of the digital still camera 1 receives the pattern name 2 (STAR5) and the display pattern 2 (FIG. 7D) through the I/O port 38 (step ST4), and stores them in the image memory 27 (step ST5).

Explained next is the photographing process of photographing an image of the object while displaying the star-shaped figure corresponding to the display pattern 2 (FIG. 7D) which the digital still camera 1 has received in the display pattern receiving process.

The user photographs an image of the object with the digital still camera 1, the image memory 27 of which stores the pattern name 2 (STAR5) and the display pattern (FIG. 7D) received from the printing apparatus 15. At that point the communication cable 14, which was connected to the printing apparatus 15 in the display pattern receiving process, has already been disconnected from the digital still camera 1.

The user presses the ON switch 5 of the digital still camera 1 in order to photograph an image of the object. Upon pressing the ON switch 5, the digital still camera 1 is switched on, and the CPU 30 starts the initial processing such as memory checking, etc.

Figure 11:
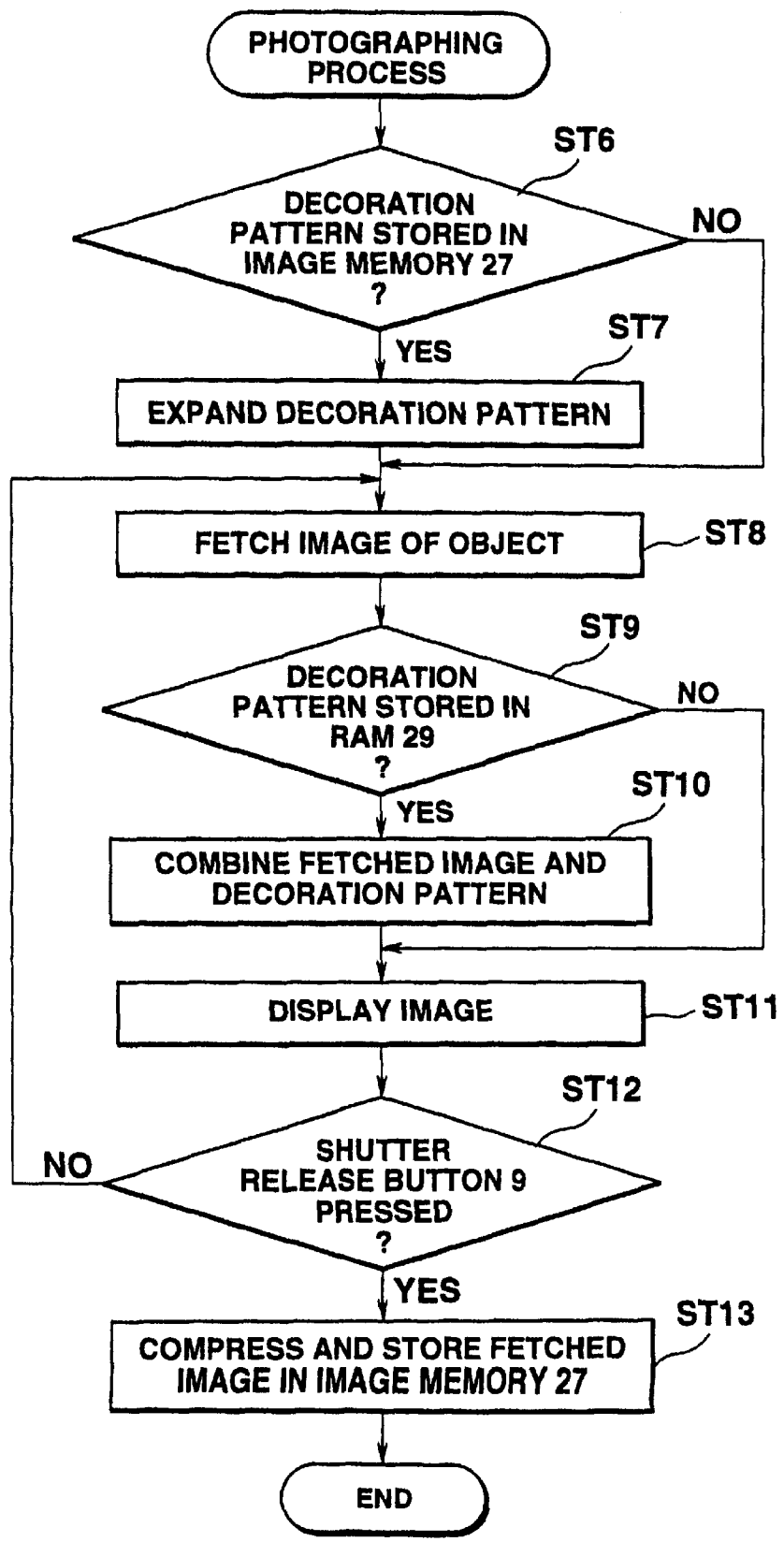
FIG. 11 is a flowchart explaining a photographing process performed by the digital still camera 1.

After finishing the initial processing, the CPU 30 starts the photographing process shown in FIG. 11.

First the CPU 30 determines whether the display pattern 2 (FIG. 7D) has been stored in the image memory 27 (step ST6).

Let it be assumed that the CPU 30 determines that the display pattern 2 (FIG. 7D) has been stored in the image memory 27. In this case, the CPU 30 expands the display pattern 2 (FIG. 7D) stored in the image memory 27 (step ST7). Specifically, the CPU 30 controls the compression/expansion section 26 to expand the display pattern 2 (FIG. 7D) compressed and stored in the image memory 27, and stores the expanded display pattern in the RAM 29.

Figure 12A:
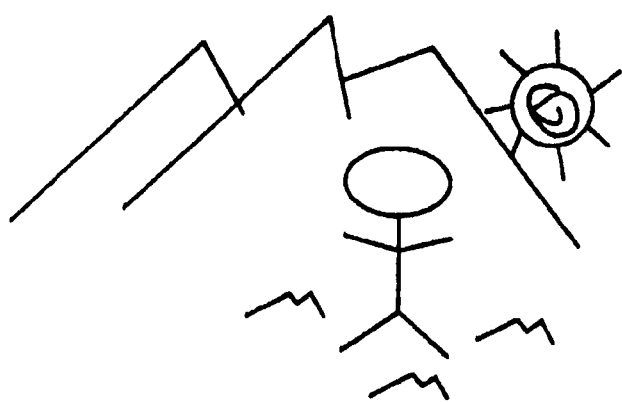
FIG. 12A is a diagram exemplifying the object to be photographed.

Then the CPU 30 fetches such an image of the object as that illustrated in FIG. 12A (step ST8). The CPU 30 controls the timing generator 23 so that the driver 22 causes the CCD 20 to receive incident light coming from the object. The CCD 20 converts the received light to an image signal under the control of the driver 22, and supplies the image signal to the A/D converter 24a through the amplifier 24b. The A/D converter 24a converts the image signal supplied from the CCD 20 through the amplifier 24b to image data, and supplies the image data to the DRAM 25. The DRAM 25 stores the image data supplied from the A/D converter 24a.

Next the CPU 30 determines whether the display pattern has been stored in the RAM 29 (step ST9).

Let it be assumed that the CPU 30 determines that the display pattern 2 (FIG. 7D), expanded in the step ST6 (ST7), has been stored in the expanded state in the RAM 29. In this case, the CPU 30 combines the image data, representing the image of the object and stored in the DRAM 25, and the display pattern 2 (FIG. 7D) with each other (step ST10). Specifically, the CPU 30 combines the image data stored in the DRAM 25 and the display pattern 2 (FIG. 7D) stored in the RAM 29 with each other, and processes the resultant composite image data, after which the CPU 30 supplies the processed image data to the VRAM 33, which stores the supplied image data.

Figure 12B:
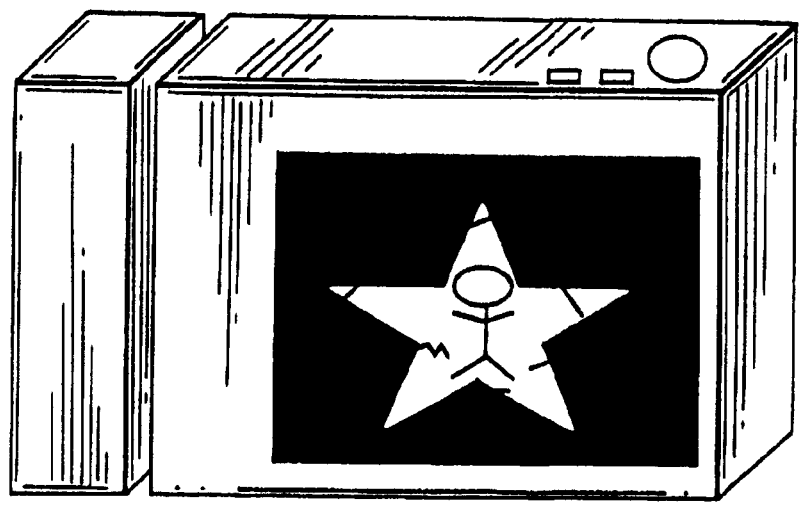
FIG. 12B is a diagram illustrating a display pattern and an image of the object, both being displayed on the color LCD 35 of the digital still camera 1 at the time of photographing.

Following the above, the CPU 30 makes the color LCD 35 display the image data stored in the VRAM 33 (step ST11). The CPU 30 controls the video signal generating section 32 so that it creates a digital video signal from the image data stored in the VRAM 33 and supplies the digital video signal to the D/A converter 34. The D/A converter 34 converts the digital video signal supplied from the video signal generating section 32 to an analog video signal under the control of the CPU 30, and supplies the analog video signal to the color LCD 35 through the amplifier 36. The color LCD 35 applies a conversion to the video signal supplied from the D/A converter 34 through the amplifier 36, and displays a composite image such as that shown in FIG. 12B.

Until the shutter release button 9 is pressed, the CPU 30 repeats at every predetermined timing the processing executed in the steps ST8 to ST11, i.e., combining the photographed image data and the display pattern 2 (FIG. 7D) with each other and causing the color LCD 35 to display the resultant composite image. While the viewfinder 4 (the color LCD 35) is displaying the composite image which is the combination of the image of the object and a star-shaped figure, the user can balance the image with the star-shaped figure.

After balancing the image of the object with the star-shaped figure, the user presses the shutter release button 9. Upon pressing the shutter button 9 (step ST12), the key input section 31 generates a trigger signal representing an instruction to fetch the image, and supplies the trigger signal to the CPU 30.

In response to the trigger signal, the CPU 30 compresses the image data representing the image of the object and stored in the DRAM 25, and stores the compressed image data in the image memory 27 (step ST13). To be specific, the CPU 30 processes the image data stored in the DRAM 25 into luminance data and chrominance data, after which the CPU 30 controls the compression/expansion section 26 so that the section 26 compresses the image data and supplies the compressed image data to the image memory 27. The image memory 27 stores the image data supplied from the compression/expansion section 26.

Explained next is the combining and printing processes. In those processes, the image which the user has photographed with the digital still camera 1 after balancing the image with a display pattern, is sent to the printing apparatus 15, and the photographed image and a decoration pattern are combined into a composite image and printed as explained previously.

The user couples the communication cable 14 to the communication terminal 19 and the communication terminal 13 as shown in FIG. 1, thereby connecting the printing apparatus 15 and the digital still camera both of which have not yet been switched on. Then the user presses the "POWER" key 18d of the printing apparatus 15 and the ON switch 5 of the digital still camera 1. Upon pressing the "POWER" key 18d, the printing apparatus 15 is switched on, and the CPU 40 starts the initial processing such as memory checking, etc. Meanwhile, when the ON switch 5 is pressed, the digital still camera 1 is switched on, and the CPU 30 starts initial processing such as memory checking, etc.

Figures 13A, 13B:
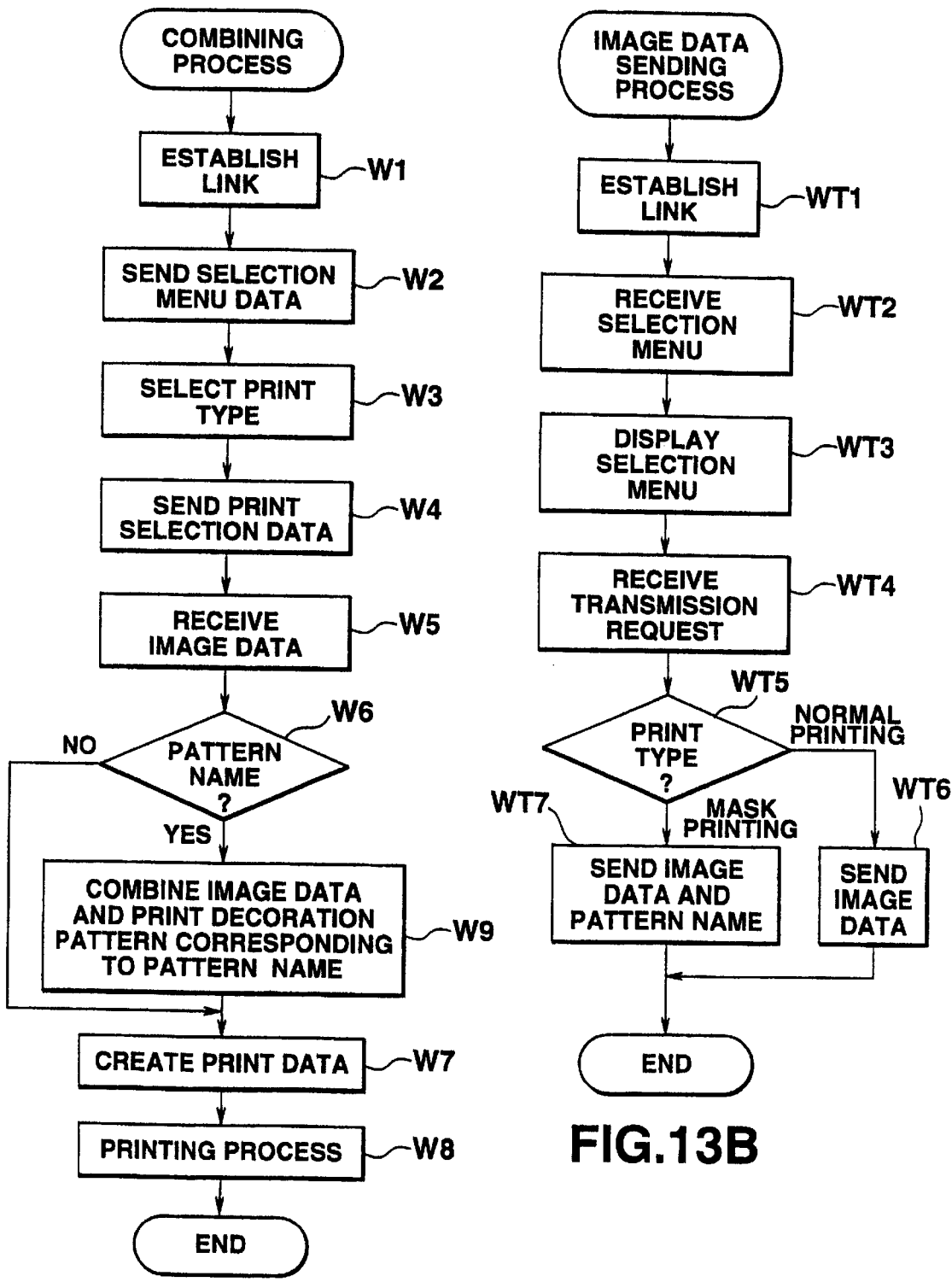
FIG. 13A is a flowchart which explains combining and printing processes performed by the printing apparatus 15.
FIG. 13B is a flowchart explaining an image data sending process performed by the digital still camera 1.

After finishing the initial processing, the CPU 40 in the printing apparatus 15 starts the combining process shown in FIG. 13A. Meanwhile, the CPU 30 in the digital still camera 1 starts the image data sending process shown in FIG. 13B after finishing the initial processing.

Control data, etc. are transmitted between the CPU 40 and the CPU 30 through the I/O port 45 and the I/O port 38 so that a data link is established (step W1, step WT1). The data link is established in the following manner. First, as shown in FIG. 9, the printing apparatus 15 supplies the transmission request data (ENQ) to the digital still camera 1. The digital still camera 1, which has received the transmission request data (ENO), sends back the acknowledgment data (ACK) to the printing apparatus 15. The data link is established when the printing apparatus 15 has received the acknowledgment data (ACK) from the digital still camera 1.

When the data link is established, the CPU 40 of the printing apparatus 15 sends the print selection menu data stored in the ROM 46 to the digital still camera 1 through the I/O port 45 (step W2). The CPU 30 of the digital still camera 1 receives the print selection menu data through the I/O port 38 (step WT2), and stores the received data in the DRAM 25. The CPU 30 of the digital still camera 1 processes the print selection menu data stored in the DRAM 25 into that for being displayed, and stores the processed data in the VRAM 33. The CPU 30 controls the video signal generating section 32, and makes the color LCD 35 display a print selection menu shown in FIG. 14 in accordance with the print selection menu data stored in the VRAM 33 (step WT3).

Figure 14:
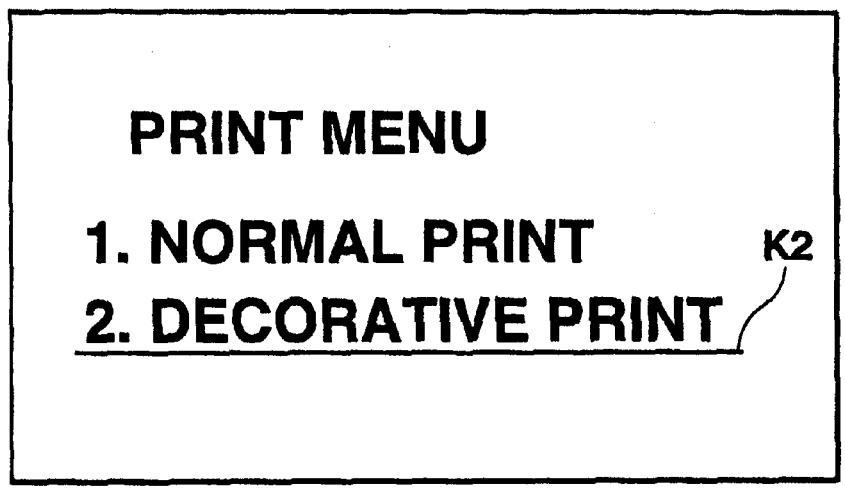
FIG. 14 is a diagram illustrating a print selection menu displayed on the color LCD 35.

Then the user inserts a sheet of paper P in the sheet insertion/discharge slot 16. After this, in order to select the desired way of printing from the print selection menu displayed on the color LCD 35, the user moves a cursor K2 illustrated in FIG. 14 upward and downward by pressing the "−" key 18a and the "+" key 18b, and designates one item on the print selection menu with the cursor K2. After the user has moved the cursor K2 to the item "DECORATIVE PRINT" as shown in FIG. 14, he/she presses the "SET" key 18c in order to print the composite image which is the combination of a decoration pattern and the photographed image. Upon pressing the "SET" key 18c, the key input section 44 generates a trigger signal indicating "DECORATIVE PRINT", and inputs a selection command to the CPU 40 through the selection section 43 (step W3).

In response to the selection command, the CPU 40 of the printing apparatus 15 sends, to the digital still camera 1 through the I/O port 45a, a request for transmission of data to be combined and printed (step W4).

The CPU 30 of the digital still camera 1 receives the request for transmission from the printing apparatus 15 through the I/O port 38 (step WT4). The CPU 30 determines whether the received request is for transmission of data to be printed normally or for transmission of data to be printed after combined with a decoration pattern (step WT5).

When the CPU 30 of the digital still camera 1 determines that the received request is one for transmission of data to be printed after combined with a decoration pattern, the CPU 30 reads out the pattern name 2 (STAR5) and photographed image data stored in the image memory 27, and supplies them to the printing apparatus 15 through the I/O port 38 (step WT7). When the CPU 30 determines that the received request is one for transmission of data to be printed normally, the CPU 30 reads out only the photographed image data from the image memory 27, and supplies the read-out image data to the printing apparatus 15 through the I/O port 38 (step WT6).

The CPU 40 of the printing apparatus 15 receives the pattern name 2 (STAR5) and the image data from the digital still camera 1 (step W5), and stores them in the RAM 48. The CPU 40 determines whether any pattern name is contained in the received data (step W6).

In that case, the pattern name 2 (STAR5) is contained in the data received from the digital still camera 1, under which condition the CPU 40 executes the image data combining process (step W9). To be specific, the CPU 40 reads out the print decoration pattern 2 (FIG. 7C) specified by the received pattern name 2 (STAR5) from the ROM 46, controls the expansion section 42 to expand the read-out decoration pattern, and combines the expanded decoration pattern and the image data stored in the RAM 48 with each other.

Next the CPU 40 of the printing apparatus 15 processes the resultant composite image data into data for being printed (step W7). Specifically the CPU 40 processes the composite image data into image data of the color components corresponding to yellow (Y), magenta (M) and cyan (C), and supplies the processed image data to the image memory 41. The image memory 41 stores the supplied data as the image data for yellow (Y), the image data for magenta (M) and the image data for cyan (C).

Then the CPU 40 of the printing apparatus 15 makes the color printer section 47 print the image data stored in the image memory 41 (step W8). The CPU 40 controls the color printer section 47 to print, in the form of a composite image such as that illustrated in FIG. 15, the image data stored in the image memory 41.

Figure 15:
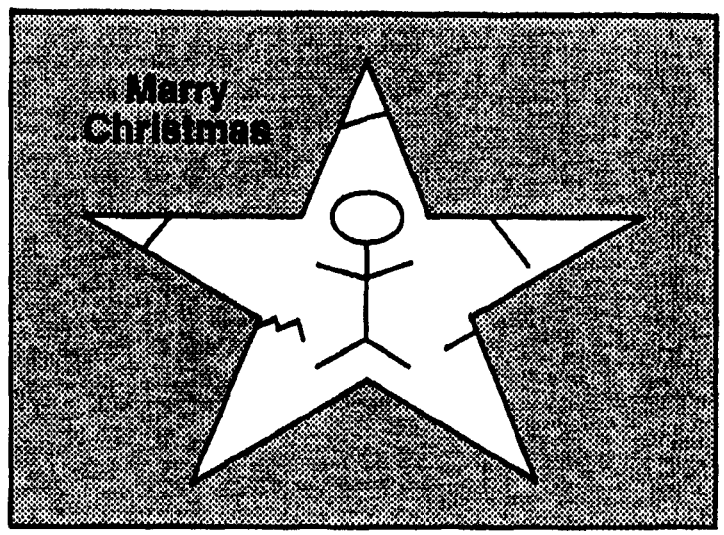
FIG. 15 is a diagram illustrating a composite image which the printing apparatus 15 prints in the combining and printing processes.

Thus, the user can attain a composite image such as that shown in FIG. 15 and in which the image data and the decoration pattern are well balanced.

In the first embodiment, the user balances an image of the object with a display pattern at the time of photographing. However, it is also possible for the user to balance an image stored in the digital still camera 1 with a display pattern at the time of printing.

The second embodiment of the present invention will now be described with reference to the accompanying drawings.

A printing system according to the second embodiment has the same structure as that of the first embodiment.

The combining and printing processes performed by the printing apparatus of the printing system according to the second embodiment of the present invention and the image sending process performed by the digital still camera of the above printing system will now be explained with reference to the drawings.

The user couples the communication cable 14 to the communication terminal 19 and the communication terminal 13 as shown in FIG. 1, thereby connecting the printing apparatus 15 and the digital still camera both of which have not yet been switched on. Then the user presses the "POWER" key 18d of the printing apparatus 15 and the ON switch 5 of the digital still camera 1. Upon pressing the "POWER" key 18d, the printing apparatus 15 is switched on, and the CPU 40 starts the initial processing such as memory checking, etc. Meanwhile, when the ON switch 5 is pressed, the digital still camera 1 is switched on, and the CPU 30 starts initial processing such as memory checking, etc.

Figures 16A, 16B:
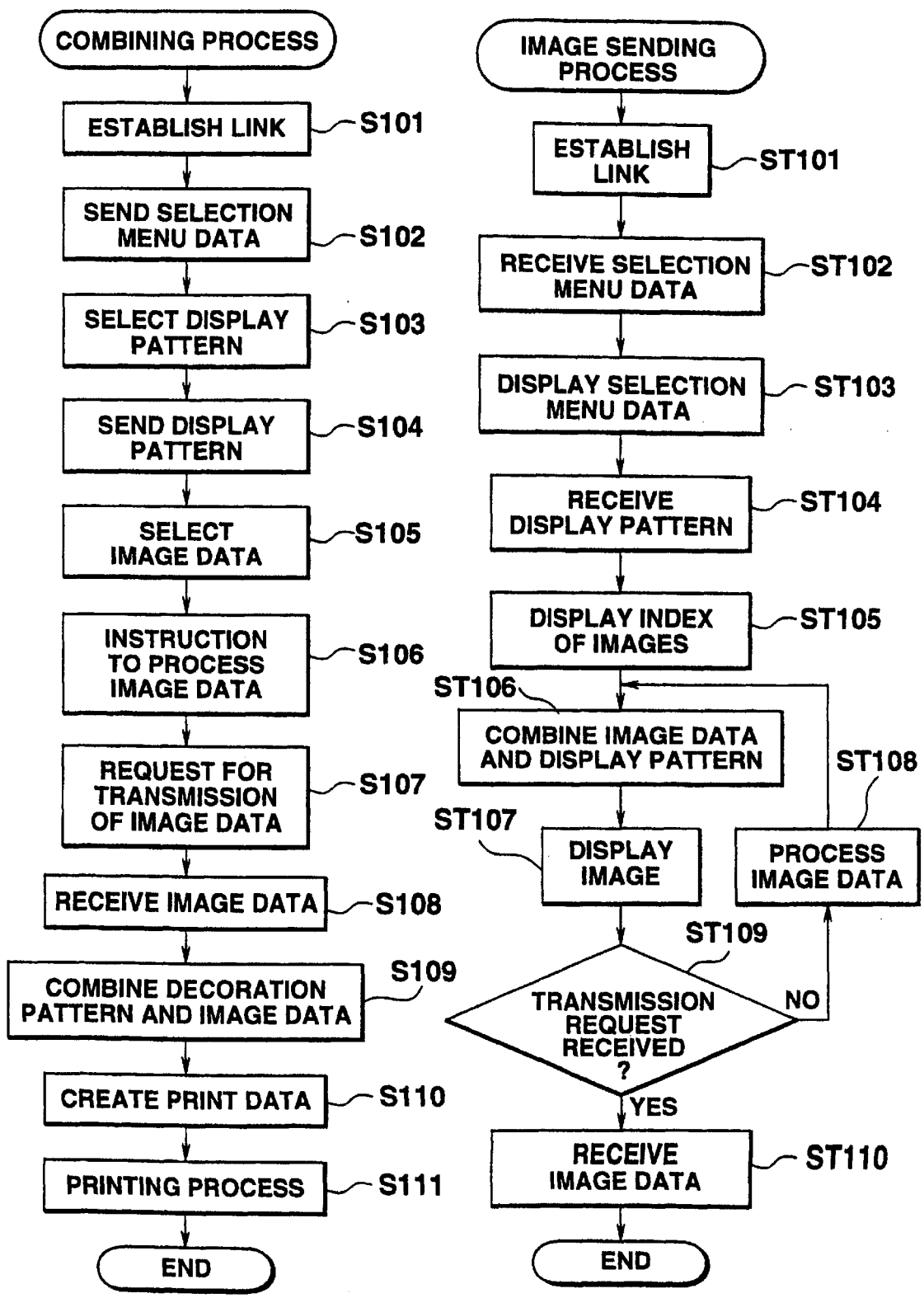
FIG. 16A is a flowchart explaining combining and printing processes performed by the printing apparatus 15.
FIG. 16B is a flowchart explaining an image sending process performed by the digital still camera 1.

After finishing the initial processing, the CPU 40 in the printing apparatus 15 starts the combining process shown in FIG. 16A. Meanwhile, the CPU 30 in the digital still camera 1 starts the image sending process shown in FIG. 16B after finishing the initial processing.

Control data, etc. are transmitted between the CPU 40 and the CPU 30 through the I/O port 45 and the I/O port 38 so that a data link is established (step S101, step ST101). The data link is established in the following manner. First, as shown in FIG. 9, the printing apparatus 15 supplies the transmission request data (ENQ) to the digital still camera 1. Having received the transmission request data (ENQ), the digital still camera 1 sends back the acknowledgment data (ACK) to the printing apparatus 15. The data link is established when the printing apparatus 15 has received the acknowledgment data (ACK) from the digital still camera 1.

Upon pressing the "MENU" key 18f, the key input section 44 generates a trigger signal representing an instruction to display the pattern selection menu, and inputs a selection command to the CPU 40 through the selection section 43.

In response to the selection command, the CPU 40 of the printing apparatus 15 reads out the pattern names from the ROM 46 which stores the decoration pattern information shown in FIG. 6, and processes the read-out pattern names into pattern selection menu data. The CPU 40 sends the pattern selection menu data to the digital still camera 1 through the I/O port 45 (step S102). The CPU 30 of the digital still camera 1 receives the pattern selection menu data through the I/O port 38 (step ST102), and stores the received data in the DRAM 25. The CPU 30 processes the pattern selection menu data stored in the DRAM 25 into that for being displayed, and stores the processed data in the VRAM 33. The CPU 30 controls the video signal generating section 32, and makes the color LCD 35 display the pattern selection menu such as that illustrated in FIG. 10, in accordance with the pattern selection menu data stored in the VRAM 33 (step ST103).

Then the user selects the desired decoration pattern from the pattern selection menu displayed on the color LCD 35. The user moves the cursor to the item "STAR7" and thereafter presses the "SET" key 18c. Upon pressing the "SET" key 18c, the key input section 44 generates a trigger signal for selecting the pattern corresponding to the "STAR7", and inputs a selection command to the CPU 40 through the selection section 43 (step S103).

In response to the selection command, the CPU 40 of the printing apparatus 15 reads out the display pattern 1 (FIG. 7B) from the ROM 46 which stores the decoration pattern information shown in FIG. 6, and sends the read-out pattern to the digital still camera 1 through the I/O port 45 (step S104). The CPU 30 of the digital still camera 1 receives the display pattern 1 (FIG. 7B) through the I/O port 38 (step ST104), and stores the received pattern in the image memory 29.

Figure 17A:
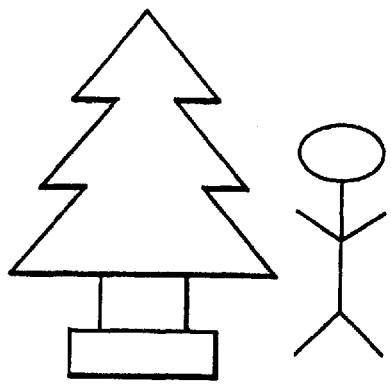
FIG. 17A is a diagram exemplifying an image stored in the digital still camera 1.

Then the CPU 30 of the digital still camera 1 makes the color LCD 35 display a index of the images stored in the image memory 27 (step ST105). Next the user selects an image such as that illustrated in FIG. 17A from the index displayed on the color LCD 35 (step S105).

Thereafter the CPU 30 of the digital still camera 1 combines the image selected in the step S105 and a display pattern stored in the RAM 29 with each other (step ST106). More specifically, the CPU 30 reads out the image selected in the step S105 from the image memory 27, and supplies it to the compression/expansion section 26. The compression/expansion section 26 expands the image data supplied from the image memory 27, and supplies the expanded image data to the DRAM 25, under the control of the CPU 30. The CPU 30 of the digital still camera 1 combines the image data stored in the DRAM 25 and the display pattern 1 (FIG. 7B) stored in the RAM 29 with each other, and processes the resultant composite image data into that for being displayed, and stores the processed data in the VRAM 33.

Figure 17B:
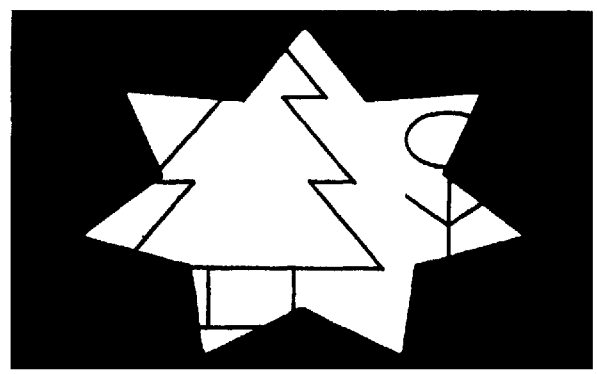
FIGS. 17B and 17C are diagrams showing composite images into which a display pattern displayed on the color LCD 35 of the digital still camera 1 and the image illustrated in FIG. 17A have been combined.

Next the CPU 30 of the digital still camera 1 makes the color LCD 35 display the composite image data stored in the VRAM 33 (step ST107). The CPU 30 controls the video signal generating section 32 so that the section 32 creates a digital video signal from the image data for display stored in the VRAM 33 and supplies the digital video signal to the D/A converter 34. The D/A converter 34 converts the digital video signal supplied from the video signal generating section 32 to an analog video signal under the control of the CPU 30, and supplies the analog video signal to the color LCD 35 through the amplifier 36. The color LCD 35 applies a conversion to the video signal supplied from the D/A converter 34 through the amplifier 36, and displays a composite image such as that shown in FIG. 17B.

Then, in order to adjust the balance between the image and the display pattern both of which are contained in the composite image displayed on the color LCD 35, the user presses "+" key 18b or the "−" key 18a such that processing instruction data representing an instruction to enlarge or minify the image is sent to the digital still camera 1 (step S106).

In that case, the CPU 30 of the digital still camera 1 determines that the control data sent from the printing apparatus 15 is not a request for transmission (step ST109), and processes the image data in response to the processing instruction data (step ST108). In the case where the process instruction data represents the instruction to minify the image, the CPU 30 minifies the image illustrated in FIG. 17A.

After balancing the image with the star-shaped figure displayed on the color LCD 35, the user inserts a sheet of paper P in the sheet insertion/discharge slot 16, and presses the "SET" key 18c. In response to the pressing of the "SET" key 18c, the CPU 40 of the printing apparatus 15 supplies a request for transmission of data to be combined and printed to the digital still camera 1 through the I/O port 45 (step S107).

The CPU 30 of the digital still camera 1 receives the transmission request from the printing apparatus 15 through the I/O port 38 (step ST109). The CPU 30 sends the processed image data to the printing apparatus 15 through the I/O port 38 (step ST110).

The CPU 40 of the printing apparatus 15 receives the image data sent from the digital still camera 1 through the I/O port 45 (step S108), and stores the received data in the RAM 48.

Next the CPU 40 of the printing apparatus 15 executes the image data combining process (step S109). To be specific, the CPU 40 reads out from the ROM 46 the print decoration pattern 1 (FIG. 7A) corresponding to the display pattern selected in the step S103. The CPU 40 expands the readout decoration pattern, and combines the expanded pattern and the image data stored in the RAM 48 with each other.

Thereafter the CPU 40 processes the resultant composite image data into data for being printed (step S110). Specifically the CPU 40 processes the composite image data into image data of the color components corresponding to three colors of yellow (Y), magenta (M) and cyan (C), and supplies the processed image data to the image memory 41. The image memory 41 stores the supplied data as the image data for yellow (Y), the image data for magenta (M) and the image data for cyan (C).

Following the above, the CPU 40 makes the color printer section print the composite image data stored in the image memory 41. In other words, the CPU 40 controls the color printer section to print, in the form of a composite image such as that shown in FIG. 17C, the image data stored in the image memory 41.

Figure 17C:
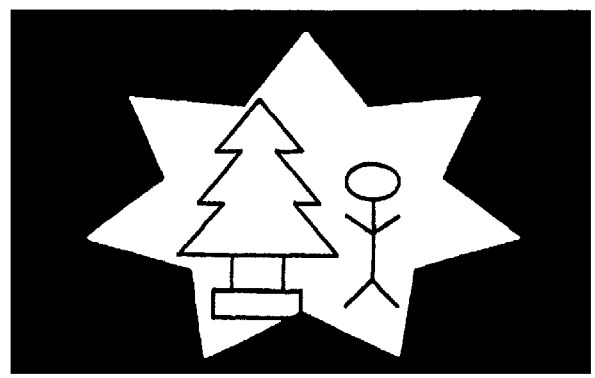

As a result, the user can attain a composite image such as that shown in FIG. 17C and in which the image data and the decoration pattern are well balanced.

In the first embodiment, a decoration pattern is sent to the digital camera 1 from the printing apparatus 15, and the digital camera 1 uses the pattern at the time of photographing. However, such a pattern can be prestored in the digital still camera 1.

In the first embodiment, the entirety of an image photographed by the digital still camera after the image is balanced with the display pattern is sent to the printing apparatus 15. However, the image from which a region overlapping the display pattern has been removed may be sent to the printing apparatus 15. In this case, the amount of image data which the printing apparatus 15 receives from the digital still camera 1 is reduced, and the communication time is reduced accordingly.

In the second embodiment, in order to adjust the balance between the image and the display pattern which are displayed on the color LCD 35, the "+" key 18b or the "−" key 18a is pressed, and the processing instruction data representing the instruction to enlarge or minify the image is sent to the digital still camera 1. However, the content of the instruction which the processing instruction data represents can be set as desired. For example, the processing instruction data may represent an instruction to change the display position in which the image is displayed.

According to the first and second embodiments, a print decoration pattern prestored in the printing apparatus 15 is used to print a composite image. However, a print decoration pattern created by the user can also be used. For example, the printing apparatus 15 may further include an EEPROM (Electrically Erasable Programmable ROM) from/in which data can be read/written. The printing apparatus 15 processes the image received from the digital still camera 1, creates a print decoration pattern, and stores the created pattern in the EEPROM. The printing apparatus 15 can print a composite image using the print decoration pattern stored in the EEPROM.

According to the first and second embodiments, the digital still camera 1 combines an image and a display pattern into a composite image, and makes the viewfinder 4 display the composite image. However, the viewfinder 4 can display an image and a display pattern on each other. For example, the viewfinder 4 of the digital still camera 1 may have two color LCDs stacked on each other, and an image and a display pattern can be displayed on the two color LCDs, respectively. Thus, the viewfinder 4 can display an image and a display pattern on each other.

What is claimed is:

1. A printing system comprising a photographing apparatus and a printing apparatus, said photographing apparatus including:

photographing means (20, 21, 22, 23, 24a, 24b) for photographing an image of an object to be photographed, image display means (35) for displaying the image photographed by said image photographing means (20, 21, 22, 23, 24a, 24b), image fetching means (30, ST13) for fetching the image photographed by said photographing means (20, 21, 22, 23, 24a, 24b), image storing means (27) for storing the image fetched by said image fetching means (30, ST13), and photographed image supplying means (38) for supplying the image stored in said image storing means (27) to said printing apparatus, said printing apparatus including:

decoration pattern storing means (46) connected to said photographing apparatus via a communication medium and provided for storing decoration patterns, image receiving means (45) for receiving the image supplied from said photographed image supplying means (38), image combining means (40, W9) for combining the image received by said image receiving means (45) and one of the decoration patterns stored in said decoration pattern storing means (46) with each other, thereby creating a composite image, and printing means (47) for printing the composite image created by said image combining means (40, W9), wherein:

said photographing apparatus further includes:

pattern receiving means (38) for receiving, from said printing apparatus through said communication medium, a display pattern having the same shape as the decoration pattern combined with the image received by said image receiving means (45), pattern storing means (27, 29) for storing the display pattern received by said pattern receiving means (38), image display control means (30, ST10) for supplying the display pattern stored in said pattern storing means (27, 29) to said image display means (35), together with the image photographed by said photographing means (20, 21, 22, 23, 24a, 24b), pattern information generating means (30) for generating pattern information specifying the display pattern which said image display control means (30, ST10) supplies to said image display means (35), and pattern information supplying means (38) for supplying, to said printing apparatus through said communication medium, the pattern information generated by said pattern information generating means (30), said printing apparatus further includes:
pattern supplying means (45) for supplying said display pattern to said pattern receiving means (38),
pattern information receiving means (45) for receiving the pattern information supplied from said pattern information supplying means (38),
decoration pattern readout means (40) for reading out, from said decoration pattern storing means (46), one of said decoration patterns which is specified by the pattern information received by said pattern information receiving means (45), and
image combining control means (40, W9) for supplying the image received by said image receiving means (45) and the decoration pattern read out by said decoration pattern readout means (40) to said image combining means (40, W9) and for controlling said image combining means (40, W9) to create said composite image.

2. A printing system comprising a photographing apparatus and a printing apparatus, said photographing apparatus including:
photographing means (20, 21, 22, 23, 24a, 24b) for photographing an image of an object to be photographed,
image display means (35) for displaying the image photographed by said image photographing means (20, 21, 22, 23, 24a, 24b),
image fetching means (30, ST13) for fetching the image photographed by said photographing means (20, 21, 22, 23, 24a, 24b),
image storing means (27) for storing the image fetched by said image fetching means (30, ST13), and
photographed image supplying means (38) for supplying the image stored in said image storing means (27) to said printing apparatus, said printing apparatus including:
decoration pattern storing means (46) connected to said photographing apparatus via a communication medium and provided for storing decoration patterns,
image receiving means (45) for receiving the image supplied from said photographed image supplying means (38),
image combining means (40, W9) for combining the image received by said image receiving means (45) and one of the decoration patterns stored in said decoration pattern storing means (46) with each other, thereby creating a composite image, and
printing means (47) for printing the composite image created by said image combining means (40, W9), wherein:
said photographing apparatus further includes:
photographed image processing means (30) for processing the image stored in said image storing means (27) and supplying the processed image to said image display means (35),
pattern receiving means (38) for receiving, from said printing apparatus through said communication medium, a display pattern having the same shape as the decoration pattern combined with the image received by said image receiving means (45),
image display control means (30) for supplying the display pattern received by said pattern receiving means (38) to said image display means (35), together with the image supplied from said photographed image processing means (30), and
image supply control means (30) for supplying the image processed by said image processing means (30) to said photographed image supplying means (38) and for controlling said photographed image supplying means (38) to supply the image to said printing apparatus through said communication medium, in accordance with an image request signal supplied from said printing apparatus through said communication medium; and said printing apparatus further includes:
pattern supplying means (45) for supplying said display pattern to said pattern receiving means (38),
image request means (40) for supplying said image request signal to said image supply control means (30) through said communication medium,
decoration pattern readout means (40) for reading out, from said decoration pattern storing means (46), one of said decoration patterns which corresponds to the display pattern supplied from said pattern supplying means (45) to said pattern receiving means (38), and
image combining control means (40, W9) for supplying the image received by said image receiving means (45) and the decoration pattern read out by said decoration pattern readout means (40) to said image combining means (40, W9) and for controlling said image combining means (40, W9) to create said composite image.

3. A photographing apparatus comprising:
photographing means (20, 21, 22, 23, 24a, 24b) connected to a printing apparatus via a communication medium and provided for photographing an image of an object to be photographed,
image display means (35) for displaying the image photographed by said image photographing means (20, 21, 22, 23, 24a, 24b),
image fetching means (30, ST13) for fetching the image photographed by said photographing means (20, 21, 22, 23, 24a, 24b),
image storing means (27) for storing the image fetched by said image fetching means (30, ST13),
photographed image supplying means (38) for supplying the image stored in said image storing means (27) to said printing apparatus,
pattern readout means (30) for reading out at least one display pattern stored in a storage medium (27, 29),
image display control means (30, ST10) for supplying said at least one display pattern read out by said pattern readout means (30) to said image display means (35), together with the image photographed by said photographing means (20, 21, 22, 23, 24a, 24b),
pattern information generating means (30) for generating pattern information specifying said at least one display pattern which said image display control means (30, ST10) supplies to said image display means (35), and
pattern information supplying means (38) for supplying, to said printing apparatus through said communication medium, pattern information generated by said pattern information generating means (30).

4. The photographing apparatus according to claim 3, wherein said image display control means (30, ST10) creates a composite image by combining the image photographed by said photographing means (20, 21, 35 22, 23, 24a, 24b) and said at least one display pattern read out by said pattern readout means (30) with each other, and supplies the composite image to said image display means (35).

5. The photographing apparatus according to claim 3, wherein said photographed image supplying means (38) extracts a part which does not overlap said at least one display pattern from the image which said image display control means (30, ST10) supplies to said image display means (35), and supplies the extracted part of the image to said printing apparatus.

6. The photographing apparatus according to claim 3, further comprising display pattern selecting means for selecting a display pattern from said at least one display pattern stored in said storage medium (27, 29) and supplying the selected display pattern to said pattern readout means (30).

7. A photographing apparatus comprising:
photographing means (20; 21, 22, 23, 24a, 24b) connected to a printing apparatus via a communication medium and provided for photographing an image of an object to be photographed,
image display means (35) for displaying the image photographed by said image photographing means (20, 21, 22, 23, 24a, 24b),
image fetching means (30, ST13) for fetching the image photographed by said photographing means (20, 21, 22, 23, 24a, 24b),
image storing means (27) for storing the image fetched by said image fetching means (30, ST13), and photographed image supplying means (38) for supplying the image stored in said image storing means (27) to said printing apparatus,
wherein:
said photographing apparatus further comprises:
photographed image processing means (30) for processing the image stored in said image storing means (27) and supplying the processed image to said image display means (35), and
pattern readout means (30) for reading out at least one display pattern stored in a storage medium (27, 29);
said image display means (35) displays said at least one display pattern read out by said pattern readout means (30), together with the image processed by said photographed image processing means (30); and
said photographed image supplying means (38) supplies the image processed by said photographed image processing means (30) to said printing apparatus through said communication medium.

8. The photographing apparatus according to claim 7, wherein said photographed image processing means (30) supplies the image stored in said image storing means (27) to said image display means (35) after subjecting said image to one of a minification, an enlargement and a change in display position.

9. The photographing apparatus according to claim 7, wherein said photographing apparatus further comprises processing signal receiving means (38) for receiving an image processing signal supplied from said printing apparatus through said communication medium, and said photographed image processing means (30) processes the image stored in said image storing means (27), in response to the image processing signal received by said processing signal receiving means (38).

10. The photographing apparatus according to claim 7, wherein said photographing apparatus further comprises request signal receiving means (38) for receiving a print request signal supplied from said printing apparatus through said communication medium, and said image supply control means (30) supplies the image processed by said image processing means (30) to said photographed image supplying means (38), in response to the print request signal received by said request signal receiving means (38).

11. A photographing apparatus comprising:
a communication unit (38) connected to a printing apparatus via a communication medium, for performing communications with said printing apparatus,
a photographing section (20, 21, 22, 23, 24a, 24b) for photographing an image of an object to be photographed,
a display unit (35) for displaying the photographed image,
a trigger generation unit (31) for generating a signal representing an instruction to fetch the photographed image,
a storage unit (29) for storing a display pattern,
an image storing unit (27) for storing the photographed image, and
a control unit (30) for controlling said communication unit (38), said photographing section (20, 21, 22, 23, 24a, 24b), said display unit (35), said trigger generation unit (31), said storage unit (29) and said image storing unit (27),
wherein:
said control unit (30) controls said photographing section (20, 21, 22, 23, 24a, 24b) to photograph the image of the object;
said control unit (30) combines the photographed image and the display pattern stored in said storage unit (29) into a composite image, and controls said display unit (35) to display the composite image;
said control unit (30) controls said image storing unit (27) to store the photographed image, in response to the signal generated by said trigger generation unit (31); and
said control unit (30) controls said communication unit (38) to send to said printing apparatus the image stored in said image storing unit (27) and pattern information specifying the display pattern combined with said image.

12. A printing apparatus comprising:
decoration pattern storing means (46) connected to a photographing apparatus through a communication medium and provided for storing a decoration pattern,
image receiving means (45) for receiving an image supplied from said photographing apparatus,
image combining means (40, W9) for combining the image received by said image receiving means (45) and the decoration pattern stored in said decoration pattern storing means (46) with each other, thereby creating a composite image, and
printing means (47) for printing the composite image created by said image combining means (40, W9),
wherein:
said printing apparatus further comprises:
pattern information generating means (45) for generating pattern information specifying said decoration pattern, and decoration pattern readout means (40) for reading out from said decoration pattern storing means (46) said decoration pattern specified by the pattern information generated by said pattern information generating means (45); and said image combining means (40, W9) combines the image received by said image receiving means (45) and said decoration pattern read out by said decoration pattern readout means (40) with each other.

13. The printing apparatus according to claim 12, further comprising pattern supplying means (45) for supplying a display pattern having the same shape as said decoration pattern to said photographing apparatus through said communication medium.

14. The printing apparatus according to claim 12, wherein said image combining means (40, W9) superimposes said decoration pattern read out by said decoration pattern readout means (40) on a blank contained in the image received by said image receiving means (45).

15. The printing apparatus according to claim 12, further comprising decoration pattern creating means (40) for creating said decoration pattern from the image received by said image receiving means (45) and for storing the created decoration pattern in said decoration pattern storing means (46).

16. A printing apparatus comprising:

decoration pattern storing means (46) connected to a photographing apparatus via a communication medium and provided for storing a decoration pattern, image receiving means (45) for receiving an image supplied from said photographing apparatus, image combining means (40, W9) for combining the image received by said image receiving means (45) and the decoration pattern stored in said decoration pattern storing means (46) with each other, thereby creating a composite image, printing means (47) for printing the composite image created by said image combining means (40, W9), wherein:

said printing apparatus further comprises processing signal supplying means (45) for supplying an image processing signal representing an instruction to process the image to said photographing apparatus through said communication medium; and said image receiving means (45) receives from said photographing apparatus the image processed in response to said image processing signal supplied from said processing signal supplying means (45).

17. The printing apparatus according to claim 16, wherein:

said printing apparatus further comprises:

pattern supplying means (45) for supplying, to said photographing apparatus through said communication medium, a display pattern corresponding to said decoration pattern, image request means (40) for supplying to said photographing apparatus an image request signal representing a request for transmission of the image, and decoration pattern readout means (40) for reading out from said decoration pattern storing means (46) said decoration pattern which corresponds to the display pattern supplied from said pattern supplying means (45) to said photographing apparatus; and said image combining means (40, W9) combines the image received by said image receiving means (45) and the decoration pattern read out by said decoration pattern readout means (40) with each other.

18. A printing apparatus comprising:

communication unit (45) connected to a photographing apparatus through a communication medium, for performing communications with said photographing apparatus, a storage unit (46) for storing a decoration pattern, a printing section (47) for printing an image, and a control unit (40) for controlling said communication unit (45), said storage unit (46) and said printing section (47), wherein:

said control unit (40) controls said communication unit (45) to receive from said photographing apparatus an image and pattern information specifying a display pattern corresponding to said decoration pattern;

said control unit (40) reads out from said storage unit (46) the decoration pattern specified by said pattern information received from said photographing apparatus;

said control unit (40) combines the decoration pattern read out from said storage unit (46) and the image received from said photographing apparatus with each other, thereby creating a composite image; and said control unit (40) controls said printing section (47) to print the composite image.

* * * * *